United States Patent [19]

Strickland

[11] Patent Number: 5,383,311
[45] Date of Patent: Jan. 24, 1995

[54] LINED STRUCTURE AND LINER

[75] Inventor: James K. Strickland, Jacksonville, Fla.

[73] Assignee: Strickland Industries, Inc., Jacksonville, Fla.

[21] Appl. No.: 133,286

[22] Filed: Oct. 8, 1993

Related U.S. Application Data

[62] Division of Ser. No. 015,166, Feb. 11, 1993, Pat. No. 5,303,518.

[51] Int. Cl.⁶ .................. E04B 1/64; E02D 29/14
[52] U.S. Cl. ............................... 52/20; 52/249; 52/269; 138/146; 220/461; 264/255; 264/276; 428/183
[58] Field of Search ............ 52/249, 20, 21, 269; 138/146, 147, ; 220/461; 264/274, 255; 428/183

[56] References Cited

U.S. PATENT DOCUMENTS

| | | | |
|---|---|---|---|
| 1,050,137 | 1/1913 | Horner | 52/444 |
| 1,712,510 | 5/1929 | Monie | 52/20 |
| 2,028,968 | 1/1936 | Carlstrom | |
| 2,816,323 | 12/1957 | Munger | |
| 3,177,902 | 4/1965 | Rubenstein | 52/DIG. 7 |
| 3,340,126 | 9/1967 | Knight | 52/249 |
| 3,533,896 | 10/1970 | Hartig | 428/119 |
| 3,759,280 | 9/1973 | Swanson | |
| 3,815,864 | 6/1974 | Loeber | |
| 3,853,452 | 12/1974 | Delmonte | 249/22 |
| 3,969,847 | 7/1976 | Campagna et al. | 52/173 R |
| 3,974,615 | 8/1976 | Ditcher | 52/699 |
| 3,979,976 | 9/1976 | Campagna, Jr. et al. | 29/244 |
| 4,023,590 | 5/1977 | Harris et al. | 52/21 |
| 4,067,659 | 1/1978 | Campagna, Jr. et al. | 404/25 |
| 4,089,139 | 5/1978 | Moffa et al. | |
| 4,103,862 | 8/1978 | Moore | 249/145 |
| 4,119,291 | 10/1978 | Polito | 249/11 |
| 4,143,849 | 3/1979 | Good | 249/11 |
| 4,170,248 | 10/1979 | Bennett et al. | 138/97 |
| 4,177,229 | 12/1979 | Moore | 264/40.5 |
| 4,318,880 | 3/1982 | McIntosh et al. | 264/267 |
| 4,363,876 | 12/1982 | Moore | 249/142 |
| 4,422,994 | 12/1983 | Ditcher | 264/219 |
| 4,427,619 | 1/1984 | Peterson | 264/333 |
| 4,472,911 | 9/1984 | Jooris et al. | 52/20 |
| 4,483,643 | 11/1984 | Guggemos | 52/20 |
| 4,484,724 | 11/1984 | Srackangast | 249/11 |
| 4,521,941 | 6/1985 | Gerhard | 24/287 |
| 4,565,347 | 1/1986 | Ditcher | 249/83 |

(List continued on next page.)

FOREIGN PATENT DOCUMENTS

2498657 7/1982 France.

OTHER PUBLICATIONS

Sulfide In Wastewater Collection and Treatment Systems, by Sulfide Task Group of the Water Pollution Management Committee of the Environmental Engineering Div. of the Am. Soc. of Civil Engrs., (1989).
Gu-Manhole Liners Ltd.
Lock Joint Flexible Manhole Sleeve.
Corrosion Below: Sewer Structure, by Ken Kienow et al., Civil Engineering Magazine, Sep. 1991.
Sewer Guard, Watertight manholde insert.
Gravity Sanitary Sewer Design and Construction, by a Joint Task Force of the Am. Soc. of Civil Engrs. and the Water Pollution Control Federation, (1982).

Primary Examiner—James L. Ridgill, Jr.
Attorney, Agent, or Firm—Banner, Birch, McKie & Beckett

[57] ABSTRACT

A plastic liner for protecting concrete manhole interior surfaces from corrosion wherein the liner includes provisions for creating a strong mechanical lock between the liner and the interior surfaces. A side of the liner which includes the provisions has a plurality of raised hollow projections with spaced sections. The mechanical lock is created when concrete is poured against the side of the liner with the projections. The concrete at least partially enters the hollow portions and fills spaces between the projection sections. The projections also intersect to enhance the mechanical lock by preventing bulging. Liner sections cover essentially all of the manhole interior surfaces. Forming a liner section by rotationally molding the plastic and cutting gaps into the projections is also disclosed.

15 Claims, 16 Drawing Sheets

U.S. PATENT DOUCMENTS

| | | | |
|---|---|---|---|
| 4,570,896 | 2/1986 | Strickland et al. | 249/27 |
| 4,586,624 | 5/1986 | Shaw | 220/469.5 |
| 4,608,280 | 8/1986 | Robinson et al. | 427/230 |
| 4,614,326 | 9/1986 | Strickland et al. | 249/180 |
| 4,650,365 | 3/1987 | Runnels | 404/25 |
| 4,685,650 | 8/1987 | Ditcher | 249/83 |
| 4,746,127 | 5/1988 | Westhoff et al. | 277/1 |
| 4,751,799 | 6/1988 | Ditcher et al. | |
| 4,796,669 | 1/1989 | St. Onge | 138/97 |
| 4,801,417 | 1/1989 | Ditcher | 264/32 |
| 4,810,453 | 3/1989 | Clarke et al. | 264/36 |
| 4,828,902 | 5/1989 | Welygan et al. | 428/183 |
| 4,919,564 | 4/1990 | Neathery et al. | 404/25 |
| 4,941,643 | 7/1990 | Ditcher | 249/145 |
| 5,081,802 | 1/1992 | Westhoff et al. | 285/158 |

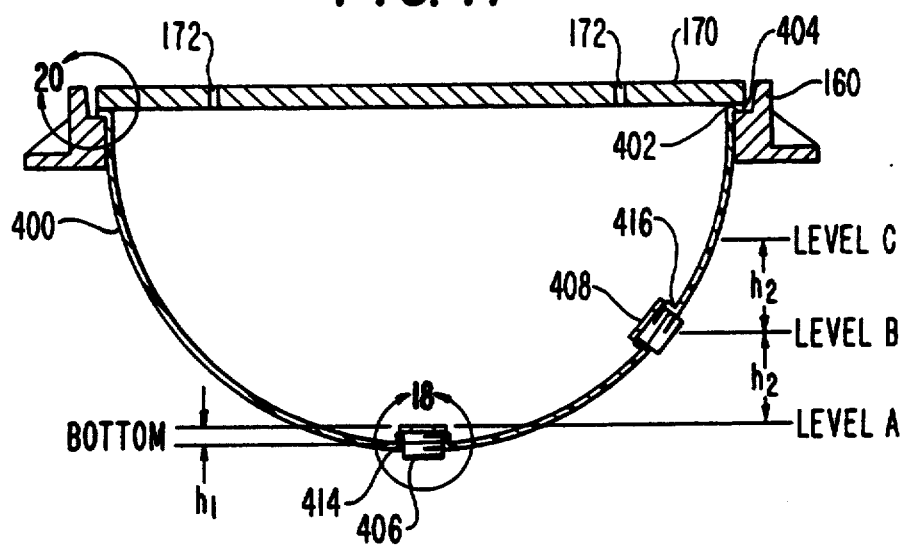
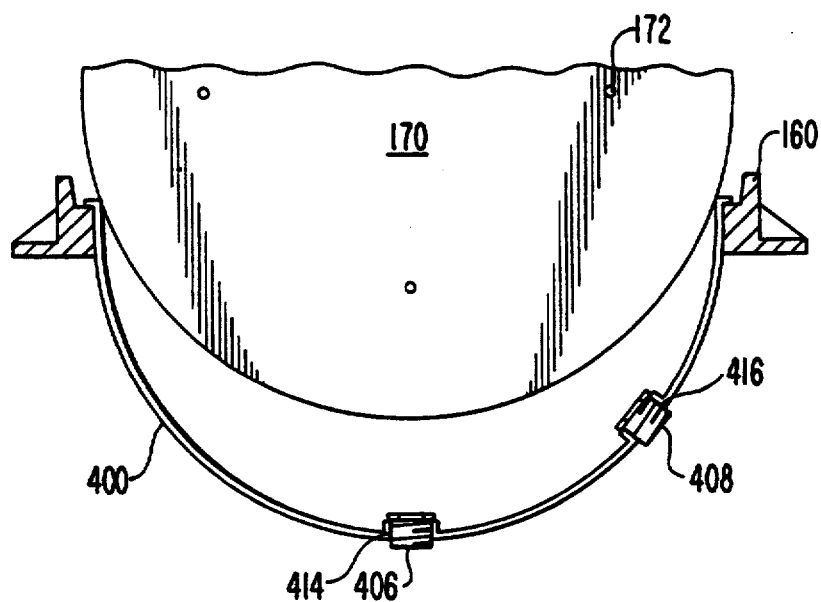
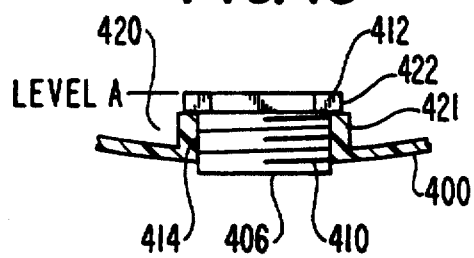
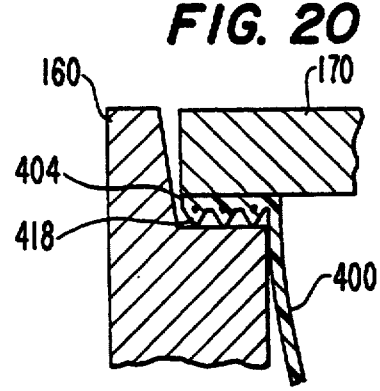

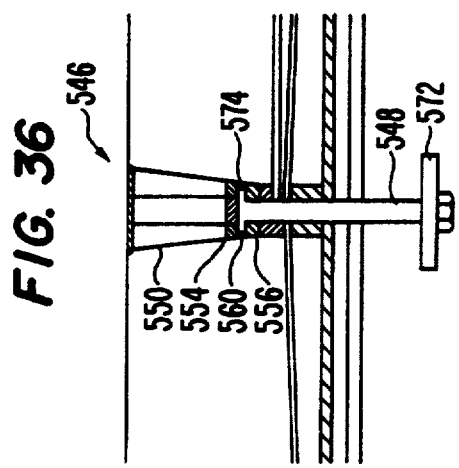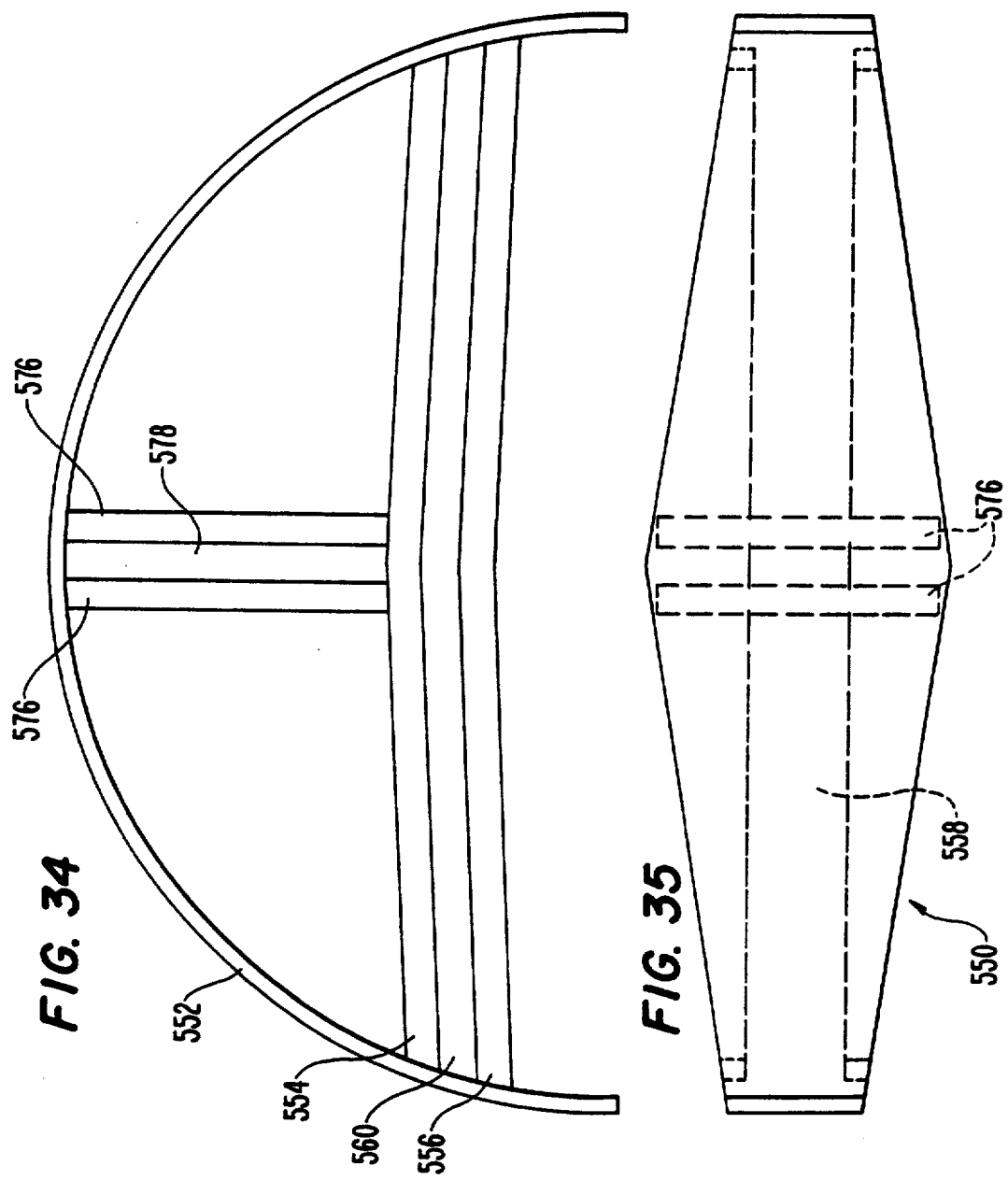

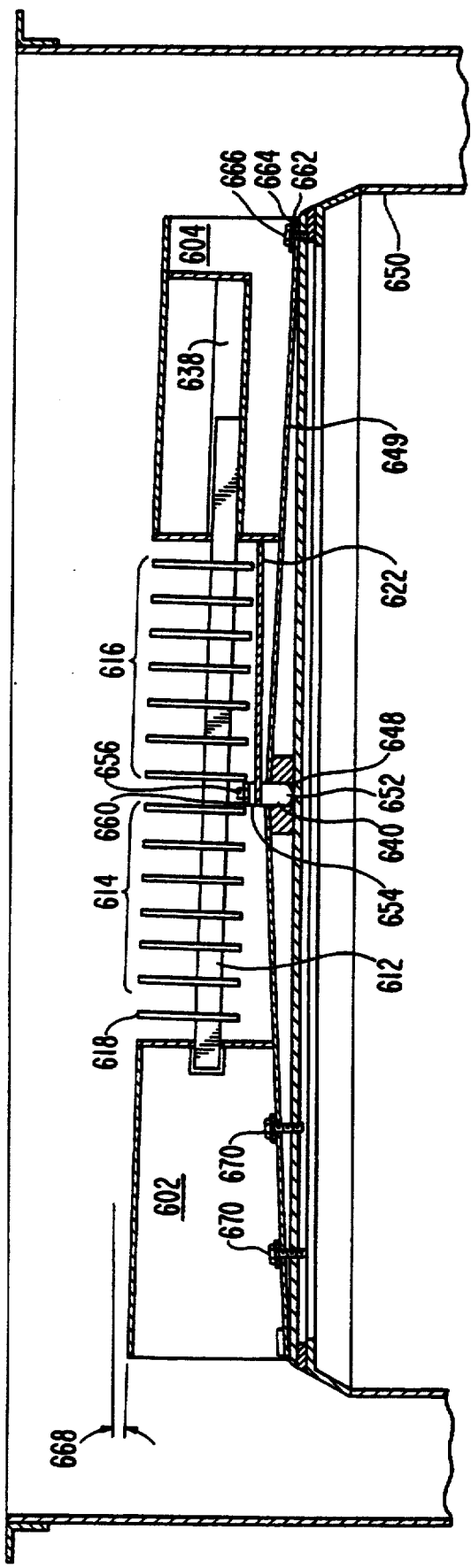
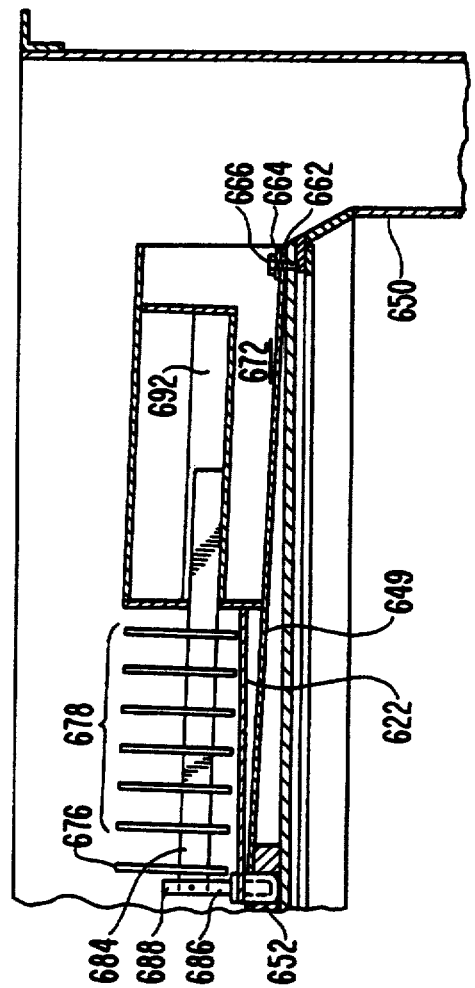

LINED STRUCTURE AND LINER

This application is a division, of application Ser. No. 08/015,166, filed Feb. 11, 1993 now U.S. Pat. No. 5,303,518.

BACKGROUND OF THE INVENTION

Modern sewer systems generally carry sewage in large diameter pipes, typically made from cement or similar material. These pipes generally are run underground. At the intersections of adjacent pipes, where it is desired to either change the course or path of the underground sewer pipe, change the slope or elevation of the sewer pipe, or merely provide access to the sewer pipe for future repair work, it is conventional to provide a manhole assembly.

A manhole assembly primarily includes a manhole base, an intermediate or riser section which is sometimes called a shaft pipe, and a top section which is frequently cone shaped and is normally designed to receive the manhole cover which is conventionally seen on city streets and sidewalks. The manhole assembly serves as the transition between adjacent sewer pipes. At least two sewer pipes fit within respective sidewall openings in the base section of the assembly, one functioning as an inlet pipe carrying sewage into the manhole assembly, and the other functioning as an outlet pipe carrying sewage from the manhole assembly. In some instances, there may be more than one inlet pipe.

Problems associated with manhole assemblies include concrete corrosion, leaking connections to inlet and outlet pipes, water leakage through the manhole cover into the manhole, and forming difficulties related to manhole base sections having channels. The present application includes a liner and lining system to overcome the corrosion problem, a pipe-to-manhole sealing assembly to prevent faulty pipe connections to the manhole, a water tight but gas pervious device just below the manhole cover to prevent excessive surface or storm water flow into the manhole, and two improved channel forming devices.

Most manhole structures are concrete, either cast in place or precast. However, concrete has been known to corrode in sewer systems primarily due to the acids contained in sewage and the gases dissipated therefrom. Concrete corrosion deteriorates manhole assemblies causing a need for expensive repairs and replacements. In addition to expensive repairs and replacement, corrosion of the concrete manhole structure causes street cave-ins which may result in traffic accidents and fatalities.

As discussed in the article "Corrosion Below: Sewer Structures" by Kenneth K. Kienow and Karl E. Kienow, corrosion in manhole interiors can be traced to two major causes. The first cause, referred to as "acid attack", is caused by low pH industrial waste discharged directly into the sewer system. Acid attack causes corrosion below the waterline of the sewage. The second cause referred to as "sulfide attack", causes corrosion above the waterline of sewage and occurs when sulfate in the sewage is converted to hydrogen sulfide gas, which is subsequently released into the air and deposited on the moist manhole wall, where bacterial action converts the gas to sulfuric acid which corrodes the manhole walls.

Corrosion of manholes is accelerated by sewage flow, and sewage and weather conditions. For example, a turbulent sewage flow can corrode a manhole significantly faster than a calm flow. Additionally, sewer stagnation can also increase manhole corrosion. The sewage pH strength and temperature, and the air current and humidity also affect corrosion of manhole walls. Corrosion can be reduced by minimizing turbulence. Turbulence is minimized by designing manholes where inlet and outlet pipes are at the same height and are not angularly disposed. However, minimizing turbulence does not fully and effectively prevent corrosion, and a better solution is needed.

Numerous attempts have been made to solve these corrosion problems. These attempts have included modifying the concrete mix, coatings that are sprayed, painted, or rolled onto the concrete surface, and liners that have integral locking projections cast into the concrete.

Attempts have been made to reduce the concrete corrosion by utilizing different compositions of the concrete, either by including additives or increasing the density. Different compositions have included the addition of one or more of the following, fly ash or pozzolanic materials, micro-silica, and high alumina cement. The effect on corrosion prevention by these compositions has been determined to be negligible at best, and detrimental at worst. Increasing the density of the concrete does help reduce corrosion. However, it is only a minor factor in corrosion prevention, and it may be costly.

Coatings which are sprayed, painted or rolled onto the manhole interior have not been successful either. These systems have been typically time consuming, costly and unreliable. Coatings depend on adhesion to stay in contact with the concrete. The unreliability of the coatings is due to the fact that their ability to adhere to the surface is very sensitive to improperly treated interior surfaces, surface moisture and weather conditions. Another disadvantage is that many coatings and adhesives are hazardous, requiring workers to be properly protected, the areas to be properly ventilated and the leftover materials used to be properly disposed of. Specific coatings which fall into this group include cementious, coal-tar epoxy, amine-epoxy, urethane, polymorphic-resin and polyester coatings. Specific problems associated with each are briefly described below.

Cementious coatings have sometimes failed because they contain cement paste which is chemically attacked by acid. Coal-tar epoxy coatings have had limited success, but environmental concerns have all but eliminated their use. Amine-epoxy coatings have failed because of chemical attack of the coating material itself and pinholes in the coatings. Urethane coatings have had many failures because they are very moisture sensitive. Polymorphic-resin coatings have been known to fail due to vapor pressure existing during the coating process. Lastly, polyester coatings have had problems because they do not tolerate dampness very well and they have also been known to have trouble handling the highly alkaline surface of good quality concrete.

Plastic liners having integral locking projections cast into the concrete have had success in reducing corrosion because the plastic protects the concrete from both acid and sulfide attack. The projections form a mechanical lock between the projections and the concrete.

FIG. 1 shows a prior an plastic liner 2 having integral T-shaped locking projections 4 as disclosed in U.S. Pat. No. 2,816,323 to Munger. Projections 4 are parallel to each other and each projection includes a leg segment 6 and a top segment 8. Liner 2 is extrusion molded in sheets and is taken to the manhole site subsequent to being formed. A sheet is rolled into a cylindrical shape corresponding to the pipe or cylindrical portion to be lined with its edges overlapping. The overlapping edges are then welded by the application of heat to the plastic. A mold for concrete is set-up and concrete is poured around liner 2 and inside the concrete mold. A mechanical lock is formed by the concrete settling between top segment 8 of projections 4 and the body of liner 2.

FIGS. 2–4 show alternatively shaped prior art parallel projections also disclosed in Munger, U.S. Pat. No. 2,816,323. FIG. 2 shows a projection 10 similar to the T-shaped projection 4, differing by having a bulbous shaped top segment 12 instead of a fiat top segment 8, while FIG. 3 shows dovetail shaped projections 14 and FIG. 4 shows pairs of inwardly converging flanges 16, 18.

The prior art liners disclosed in FIGS. 1–4 have some disadvantages. Projections 4, 10, 14 or 16 only extend in one axial direction. This arrangement provides a mechanical lock along spaced parallel axes with the sections between projections 4, 10, 14, or 16 being susceptible to bulging, which increases the possibility that projections 4, 10, 14, or 16 may pull loose from the concrete. Additionally, in practice, these liners are highly plasticized which make them vulnerable to puncturing, cutting and tearing by sewer cleaning equipment.

Another prior art device is disclosed in U.S. Pat. No. 4,751,799 to Ditcher et al., in which a lining system utilizes curved liner sections. The sections are produced by vacuum thermo-forming plastic around a curved mold member, and each section composes a quadrant of a manhole area to be lined. The curved mold member includes a plurality of strips and holes. The holes permit the vacuum forming to occur while the strips act as part of the mold to form parallel T-shaped projections on the curved liner sections. Although the projections are described in the specification as being T-shaped, the projections actually resemble a vertical leg segment with a bulbous shaped top section. The sections are thereafter cooled and removed from the mold. The quadrants are then joined together and concrete is poured around the joined cylinder forming a mechanical lock with the projections.

The Ditcher liner system also has its disadvantages. First, the liner system is very labor intensive which increases the total manhole installation cost. Secondly, the projections are typically far apart which decreases the strength of the mechanical lock between the concrete and the liner. Additionally, the liner system is designed for manhole walls which makes it difficult to use such a system on a manhole floor.

Prefabricated plastic and fiberglass manholes have been introduced but they are not typically used in the industry because they are expensive, difficult to install, and in high groundwater areas have been known to float out of the hole without proper ballast or anchorage.

Thus a lined manhole assembly which has a strong mechanical lock and which effectively protects concrete manholes from corrosion is desired. Further, it is desirable that the liner not bulge after installation. It is also desirable to provide an inexpensive liner system which can cover essentially the entire manhole interior and which is not labor intensive.

In addition to manhole interior corrosion, fitting assemblies for attaching an inlet or outlet pipe to the manhole have also created problems. Differential settling of the manhole and the sewer pipe can break the pipe causing infiltration and exfiltration at the pipe to manhole connection. This problem occurs more frequently in areas where the soil conditions are unstable. A pipe joint located just outside the manhole tends to permit flexibility between the sewer pipe and the manhole and reduce the possibility of pipe breakage. Prior art devices, which include elastomeric gaskets and couplings, are intended to reduce these occurrences by providing a flexible, watertight connection between the manhole and the sewer pipe. Many prior art devices, however, have failed resulting in infiltration and exfiltration at the pipe-to-manhole connection. Further, many prior art devices use pipe clamps which are difficult to use and can cause failures.

Many existing pipe-to-manhole fitting assemblies do not permit high tolerances between the pipe and the hole in the manhole wall, subsequently causing difficult installations and cracked or broken pipes due to differential settlement between the pipe and the manhole. A pipe-to-manhole fitting assembly which permits high tolerances between the pipe and the hole in the manhole wall allows flexure of the pipe and differential settlement that otherwise would break the pipe. Thus, it is desirable to provide a pipe to manhole fitting assembly which is easy to install, eliminates leakage and provides high tolerances for pipe movement.

Another problem existing in sewer systems is the infiltration of rainwater into the sewer system through the manhole covers. During a rainy day, 3,000 to 12,000 gallons of rainwater can enter sewer treatment systems through the pickholes in an average sized manhole cover. This rainwater infiltration has been known to result in a flow increase of up to 40% of the volume handled by sanitary sewer systems overburdening treatment plants and creating contamination problems via overflows to waterways.

In many regions, the increased construction of streets, buildings and parking lots, has decreased available ground surface area which is necessary to absorb moisture from rain and snow. This has caused more drainage water to enter existing sanitary sewer systems, many of which are already operating at peak levels. By significantly preventing rainwater from entering into sanitary sewer systems through the manhole covers, many existing overburdened sanitary sewer facilities could operate at safe levels and sewer facilities already operating at safe levels can handle additional sewage capacity.

However, in preventing water leakage through the manhole cover, the manhole opening should not be totally sealed because when sewers are sealed gas-tight, the sulfide and corrosion problem is exacerbated. It is important that fresh air be dram naturally into the sewer as sewage flow levels drop to minimize corrosion by reducing sulfide production and diluting sewer hydrogen sulfide gas concentrations. With no oxygen entering the manhole from the outside air, the sewer becomes septic and creates high levels of hydrogen sulfide gas. Further, it is important to reduce the buildup of pressure from the sewer gases inside the manhole because restricting the ability of hydrogen sulfide gas from exiting the manhole also increases corrosion.

U.S. Pat. No. 3,969,847 to Campagna et al., U.S. Pat. No. 4,650,365 to Runnels, and U.S. Pat. No. 4,919,564 to Neathery et at., disclose manhole inserts for installation directly underneath the manhole cover. These inserts prevent water inflow and permit internal sewer gas relief upon the internal pressure exceeding a fixed value. However, these inserts use valves or spring loaded members to permit the sewer gas relief, which increase the cost of the insert and have the ability to fail. More importantly, some of these devices are unable to permit fresh outside air from entering the manhole increasing sulfide production and sewer hydrogen sulfide gas concentrations. Therefore, an inexpensive and reliable valveless manhole insert preventing substantial water inflow and permitting internal sewer gas exit and outside air ingress is desired.

Another problem contemplated by this invention is the difficulty of forming manhole base sections with channels, which are required to accommodate one, two, three or more inlet pipes, and an outlet pipe, at numerous different angular configurations.

Inlet and outlet sewer pipes do not abut within the riser. Instead the floor of the manhole base section includes a channel or channels which carry the flow from the inlet or inlets to the outlet. The channels are merely U-shaped troughs which connect the inlet pipe or pipes to the outlet pipe.

It is important for the channels to be properly formed in the manhole assembly to assure smooth flow and maximize the flow rate and minimize turbulence through the manhole assembly. Most manhole base sections provide a channel which extends along a diameter of the manhole floor. The inlet sewer pipe merely rests in the manhole base section at one end of the channel and the outlet sewer pipe rests at the diametrically opposite end, with the channel serving to connect the two aligned pipes. The inlet and outlet pipes thus form a straight line, or in other words, the outlet pipe is disposed at 180° with respect to the inlet pipe. These base section floors with "straight line" channels can be readily made at a factory and shipped to a job site for easy use. These assemblies typically are formed using a so-called one-pour or single pour technique in which mold members form and define the base section having a wall and a floor with a channel. However, in a significant number of situations, it is required that the inlet sewer pipe be angularly disposed with respect to the outlet sewer pipe. Thus, the channel would not extend straight across the manhole along the diameter, but instead, must be curved or angled to connect, for example, an inlet sewer pipe which enters a manhole at the twelve o'clock position and an outlet sewer pipe which exits the manhole at the three o'clock position or disposed at 90° with respect to the inlet.

It is not practical to provide a channel forming apparatus for each angular relationship which may be required at different sites along the sewer line. Typically, angled channels in manhole base section floors have been formed in two stages, referred to as a two-pour technique. Part of the manhole base section floor without the channel is formed at the factory and delivered to the job site. The base section floor without the channel is positioned in the ground at the site of the manhole assembly and a forming apparatus for forming a channel is lowered into the hole along with a workman who manually forms the channel and completes the floor. This process is time-consuming, subject to difficult quality control problems because of the differing nature of each channel formed in each manhole base section floor, and is quite costly.

Various devices for forming channels in base section floors at various angular positions in a manhole assembly have been proposed. U.S. Pat. No. 4,484,724 to Srackangast discloses an apparatus for forming curved channels which uses a plurality of complementary wedge-shaped forming elements. The correct number and size of elements must be selected and manually fixed together. This is a time-consuming and laborious process and subject to a substantial amount of trial and error in selecting the correct elements. Similarly, U.S. Pat. Nos. 4,103,862 to Moore; and 4,422,994 and 4,685,650 to Ditcher disclose channel forming devices which are difficult and time-consuming to use. Accordingly, there is a need for a channel forming assembly for forming a channel or channels in a manhole base section floor accommodating one, two or three incoming sewer pipes having any desired angle between each incoming sewer pipe and the outgoing sewer pipe over a range of approximately 90° to 270° which is simple and economical to use.

SUMMARY

In view of the foregoing, it is a principal object of the present invention to provide an improved liner for concrete structures, including manhole interiors.

More specifically, it is an object of the invention to provide a liner which creates a strong mechanical lock with a concrete manhole wall surface in both horizontal and vertical directions to eliminate bulging, while protecting the concrete manhole wall from corrosion from acid and sulfide attack.

Another object of the invention is to provide a liner system which can cover essentially all of the portions of the manhole interior, including the manhole floor and all manhole interior walls.

It is yet another object of the invention to provide a long lasting fined manhole structure which will not corrode or need subsequent repair.

Another object of the invention is to provide a finer for lining manholes which is easy to install and is not labor intensive.

Still another object is to provide an essentially totally sealed manhole system by lining the manhole floor and all manhole interior walls, by sealing the juncture to inlet and outlet pipes, and by providing a manhole insert under the manhole cover for preventing excessive rain water flow into the manhole from the street.

Another object is to provide a system which eliminates the need for workmen to enter a confined below-ground space in the field to connect adjacent liner sections, seal joints, or form channels in the manhole base section floor.

These and other objects are achieved by the present invention which, according to one aspect, provides a plastic liner which is resistant to corrosion for lining and protecting a surface. The liner including a first side and an opposed second side having a plurality of spaced raised projections adapted to be embedded within the surface to be protected. The spaced raised projections are hollow providing a mechanical lock between the liner and the protected surface.

In a second aspect, the invention provides a plastic liner which is corrosion resistant for lining and protecting a surface. The liner includes a first side and an opposed second side having a plurality of spaced ribs including cut out portions providing a mechanical lock between the liner and the surface.

In another aspect, the invention provides a corrosion proof plastic liner for lining and protecting a surface. The liner having a first side and an opposed second side with intersecting first and second raised projections adapted to be embedded within the protected surface.

In yet another aspect, the invention provides a process of forming a corrosion resistant plastic liner for lining and protecting a surface against corrosion. The process includes providing a mold including impressions in the shape of projections to be molded, pouring material into the mold forming a liner with projections, rotationally molding the liner such that the formed projection are hollow, and removing the liner from the mold.

The invention provides in an additional aspect, a method of forming a lined concrete section for a manhole including providing a liner including hollow projections, cutting gaps in the projections, providing a mold for shaping the lined concrete element to be formed, placing the liner in the mold, and pouring concrete such that the concrete enters the gaps and the hollow projections to form a mechanical lock between the concrete element and the liner upon curing of the concrete.

In yet another aspect, the invention provides a lined manhole assembly having a base section, an upper section, and a liner. The base section includes an interior floor surface and a wall with an interior wall surface, a first hole for connection to an outlet pipe, a second hole for connection to an inlet pipe, and a top surface. The interior floor surface having a channel creating a connection channel from the second hole to the first hole, and the interior floor surface being sloped downwardly toward a portion of the channel. The upper section being vertically superimposed with the base section and having a wall with an interior wall surface, a top surface, and a bottom surface. The bottom surface of the upper section being wider than the top surface of the upper section. The liner being plastic and comprising locking members to mechanically lock the liner to a manhole interior surface. The locking members being a plurality of longitudinally spaced raised projections, and wherein each projection including longitudinally spaced sections separated by gaps.

These and other objects and features of the invention will be apparent upon consideration of the following detailed description of preferred embodiments thereof, presented in connection with the following drawings in which like reference numerals identify like elements throughout.

BRIEF DESCRIPTION OF THE DRAWINGS

FIG. 17 is a cross section of the manhole insert of the present invention;

FIG. 18 is a cross section of the bottom plug and manhole insert taken from Detail C of FIG. 17;

FIG. 20 is a cross section of the peripheral seal between the insert and the supporting ring taken from Detail D of FIG. 17;

FIG. 21 is a cross section of the manhole insert with the manhole cover spun to a vertical position;

FIGS. 34-35 are side and top views, respectively, of the pivot disk included in the flexible channel forming member;

FIG. 36 is a cross section of the pivot assembly included in the flexible channel forming member;

FIG. 41 is a cross section of the manhole base forming apparatus with a channel forming device of FIG. 40 taken along the center of one of the curved channels to be formed;

FIG. 46 is a cross section of the third movable and flexible channel forming members taken along the center of one of the channels to be formed;

DETAILED DESCRIPTION OF THE INVENTION

Manhole Assembly

Figure 1:
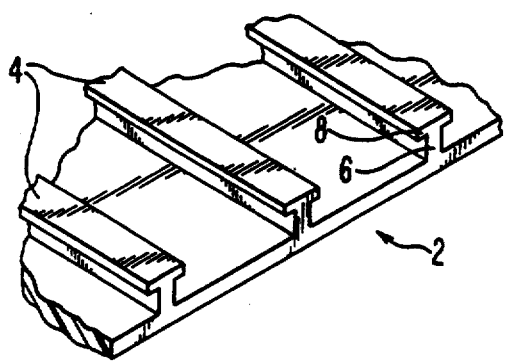
FIGS. 1-4 are perspective views of prior art liner designs.
Figure 2:
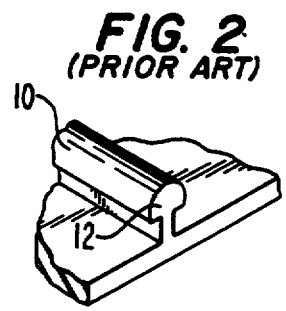
Figure 3:
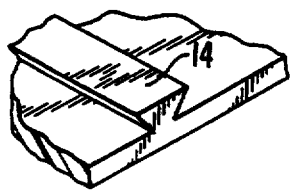
Figure 4:
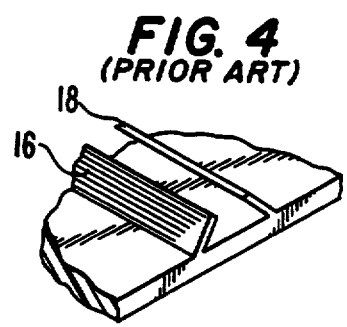
Figure 8:
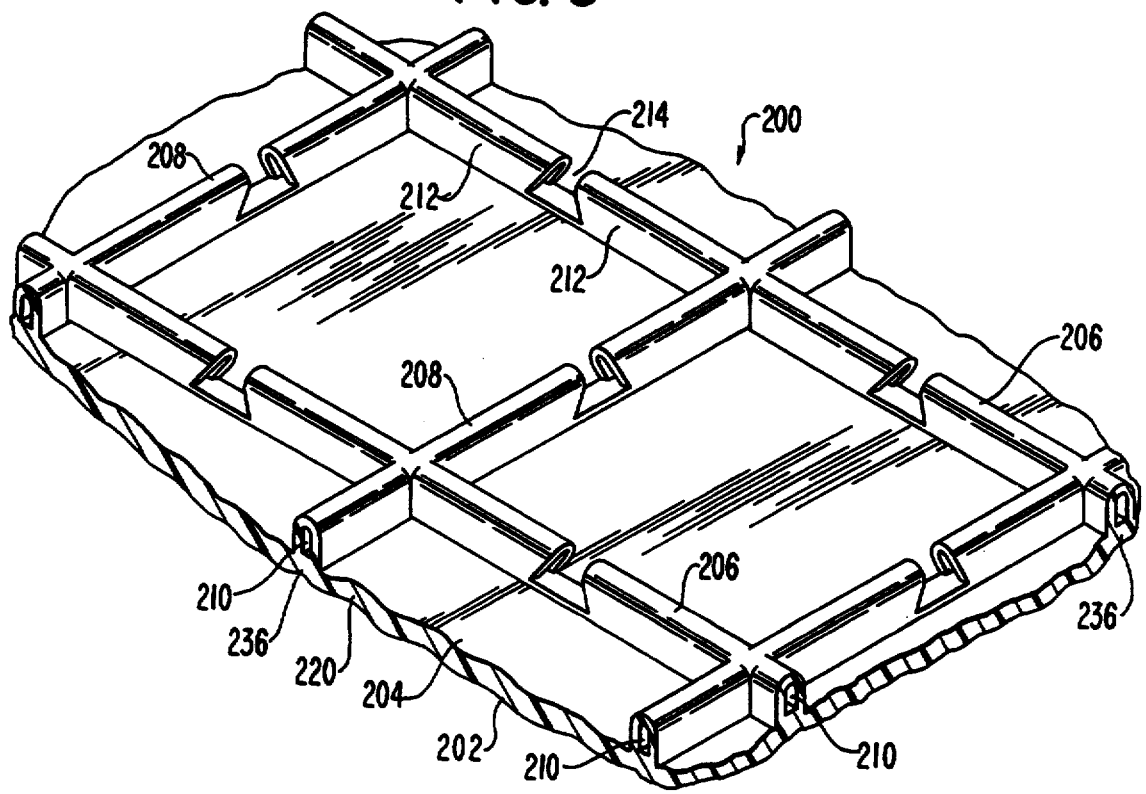
FIG. 8 is a perspective view of the liner of the present invention with the projections having dovetail shaped gaps.
Figure 5:
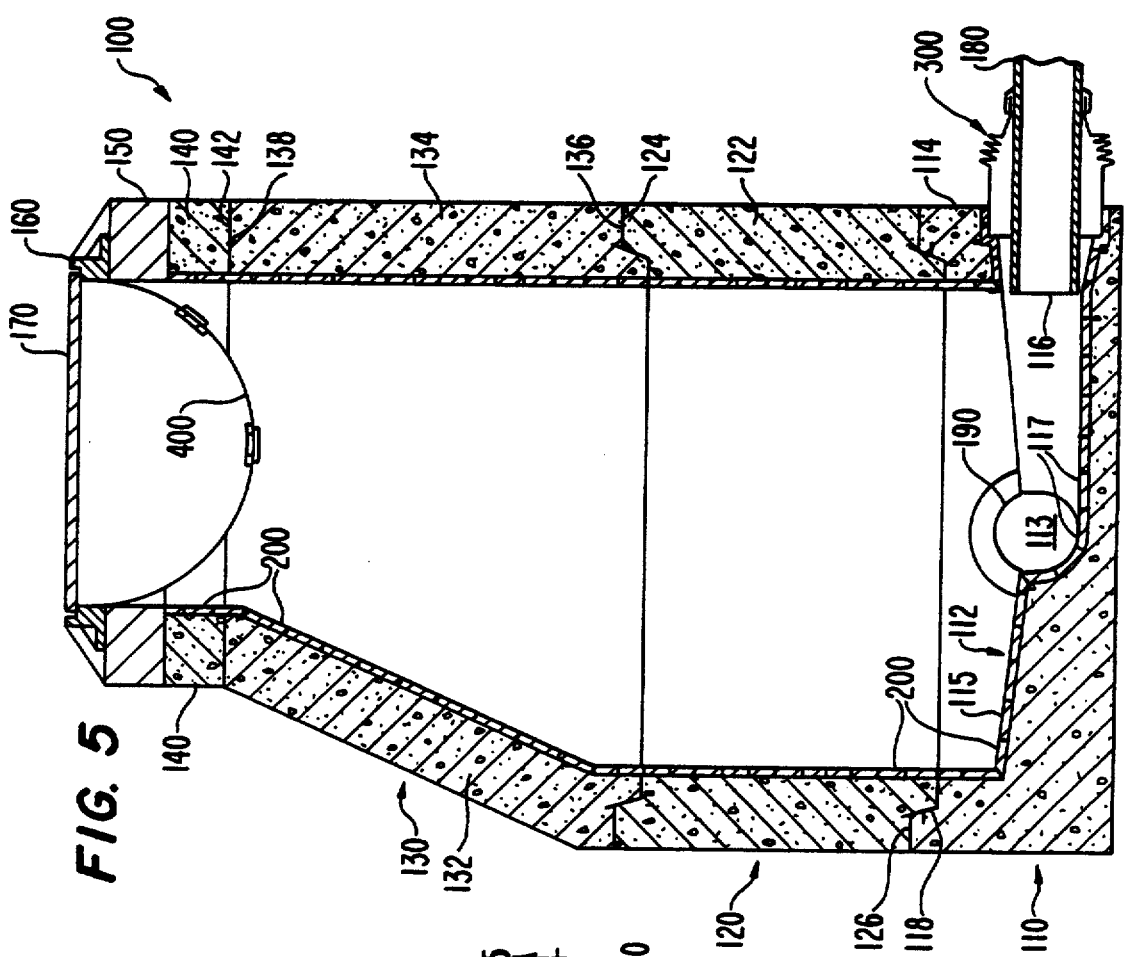
FIG. 5 is a vertical cross sectional view of a lined manhole assembly of the present invention.

FIG. 5 shows a manhole structure 100, hereinafter referred to as a manhole, mainly comprised of a base section 110, a riser section 120, a top section 130, concrete spacers 140, grade rings 150, a circular support flange 160, a manhole cover 170, and an insert 400.

Base section 110 includes a floor 112 and a cylindrical side wall 114 having at least two circular holes 116 and a top surface 118. Floor 112 includes a bench 115 and a channel or channels 113, the bottom of which is referred to as an invert 117.

Figure 6:
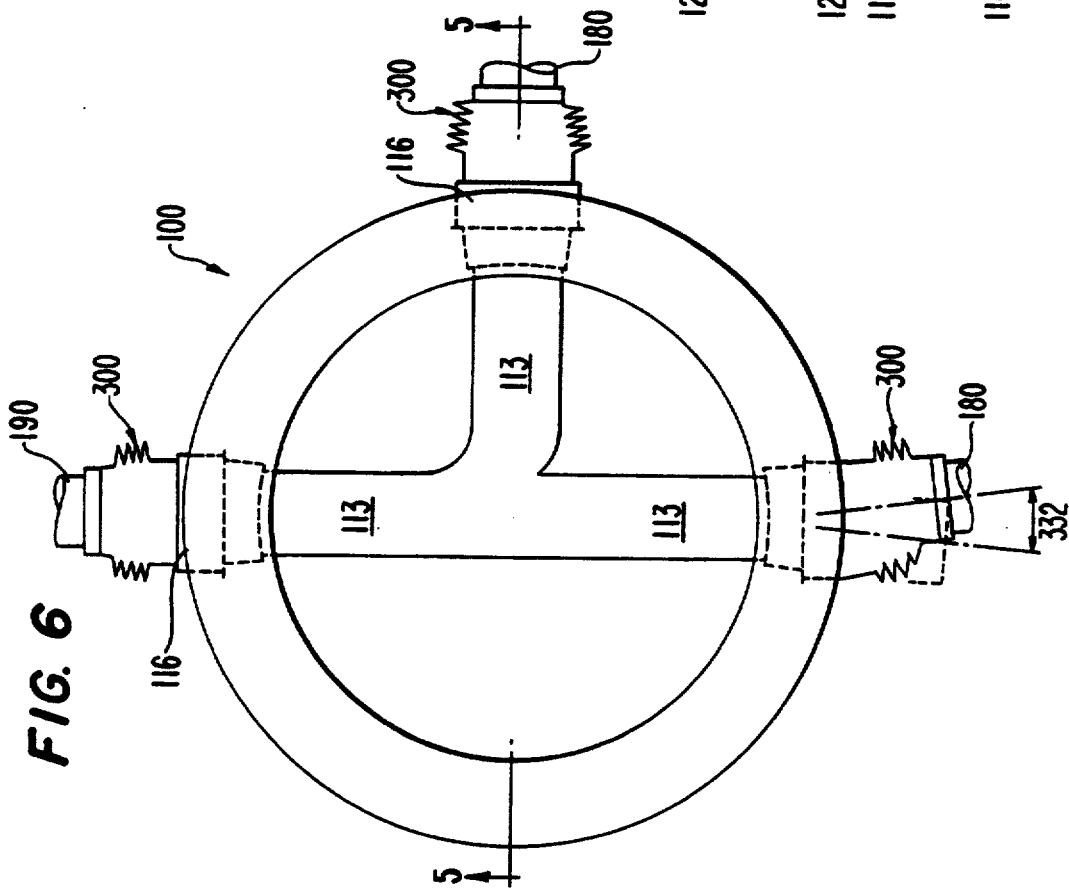
FIG. 6 is a schematic top view of the manhole assembly showing the relationship to inlet and outlet pipes.

There are typically one, two or three inlet pipes 180 which carry sewage into manhole 100 and one outlet pipe 190 for carrying sewage away from manhole 100. FIG. 6 shows two inlet pipes 180 carrying sewage into manhole 100. The number of holes 116 in base wall 114 is equal to the sum of the inlet and outlet pipes 180, 190, as there is one hole 116 in base wall 114 for each pipe. Each pipe extends into manhole 100 or abuts with a shoulder in the manhole wall 114, and mates with an end of a channel 113 in floor 112 of base section 110. A fitting assembly 300, which is explained in detail hereinafter, connects each pipe 180, 190 to manhole 100.

Riser section 120 is a right cylindrical unit having a wall 122 with a top surface 124 and a bottom surface 126. Top surface 118 of base section 110 mates with bottom surface 126 of riser section wall 122 forming a continuous inner surface.

Top section 130 is a conically shaped member having and angled wall section 132 and a straight wall section 134. The shape of top section 130 maintains the continuity of the interior wall surface between riser section 120 and spacers 140 and concrete ring 150. Top surface 124 of riser section 120 mates with a bottom surface 136 of top section wall 132, 134, while top surface 138 of top section 130 abuts with the bottom 142 of spacers 140.

In sewer designs where sewer pipes 180, 190 are located far below the street level, as indicated by manhole cover 170, more than one riser section 120 may be required. In those situations, the riser sections 120 would be vertically superimposed such that the top surface of the lowest riser section mates with the bottom surface of the riser section vertically adjacent thereto, and so on until the upper surface of the highest riser section mates with the bottom surface 136 of top section 130. In sewer designs where sewer pipes 180, 190 are located a smaller distance below the street level, riser section 120 may be eliminated and top section 130 may be stacked upon bottom section 110 such that upper surface 118 of bottom section 110 mates with bottom surface 136 of top section 130.

Figure 7:
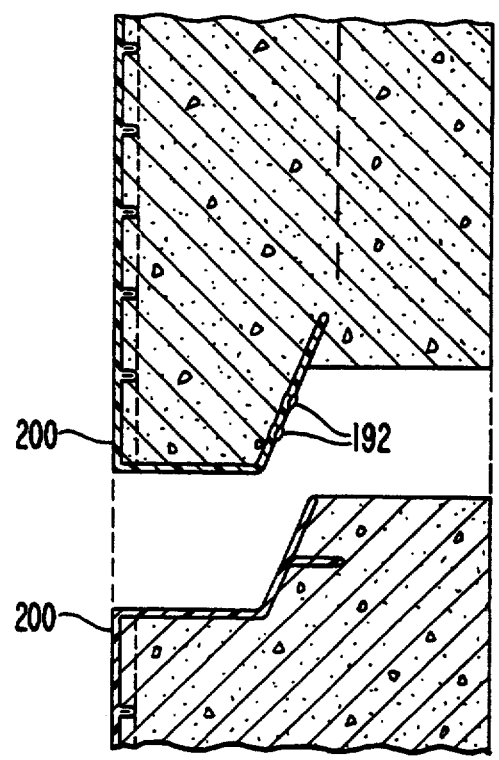
FIG. 7 is an exploded detailed vertical cross section of overlapping lined manhole sections.

The interior surfaces of base, riser, and top section 110, 120, 130 are individually covered by liner sections indicated generally by reference numeral 200. At the intersections of abutting upper and lower wall sections, the individual liner sections are welded to each other to create a sealed lining system. As best shown in FIG. 7, electrical weld conductors 192 are located between overlapping lined wall sections. As taught by U.S. Pat. No. 4,586,624 to Shaw, which is hereby incorporated by reference, an electrical current is passed through conductors 192 by lead wires, not shown, fusing the lined sections 200 together. Long lead wires are preferably used to enable the sealing of the lined sections 200 from a remote location without having to send a worker into the manhole. This eliminates the expense of ventilation, gas detection, standby rescue hoist and personnel, and the risk of injury or death to installation labor associated with confined space entry. Other details of liner 200, including liner fabrication, characteristics, installation, uses, etc., are described hereinafter.

Liner and Lining System

Plastic liners which mechanically lock with manhole interiors have been the best solution to overcoming the concrete deterioration problem. As discussed in the background, FIGS. 1-4 show prior art liners having various shaped spaced projections which mechanically lock with the concrete manhole interior surface. However, as previously discussed, they are subject to bulging between projections and separating from the concrete because the mechanical lock only extends along parallel axes.

Liner 200 of the present invention, shown in FIGS. 8-13, is also plastic and mechanically locks with the concrete manhole interior. Liner 200 includes a first or interior side 202 providing the lining surface and a second or exterior side 204 embedding into the concrete interior surface of manhole 100.

Integrally molded with exterior side 204 are a first group of spaced ribs or projections 206 oriented substantially parallel to each other, and a second group of spaced ribs or projections 208 oriented substantially parallel to each other and perpendicular to the first group of projections 206. Intersecting groups of projections 206, 208 form a grid which provides an excellent mechanical locking system, the details of which will be described hereinafter. Projections 206, 208 are hollow, providing apertures 210 which are formed in finer 200 due to the liner molding process explained hereinafter. Once liner 200 is molded, first and second groups of projections 206, 208 are cut perpendicular to their lengths producing longitudinally spaced segments 212 with gaps 214 located therebetween. Gaps 214 produce shoulders 216 in projections 206, 208 to mechanically lock liner 200 with the concrete interior manhole surface.

FIGS. 8-11 show gaps 214 being dovetail shaped producing upwardly and inwardly angled shoulders 216 and ledge 218 having a bottom surface. If desired, gaps 214 can be made with a depth equal to or higher than the height of projections 206, 208, thus eliminating ledge 218. An angled cut with a height exceeding the height of projections 206, 208 would extend into the liner body 220 and provide additional locking strength because the shoulders would extend into body 220 increasing the length of shoulders 216.

Figure 12:
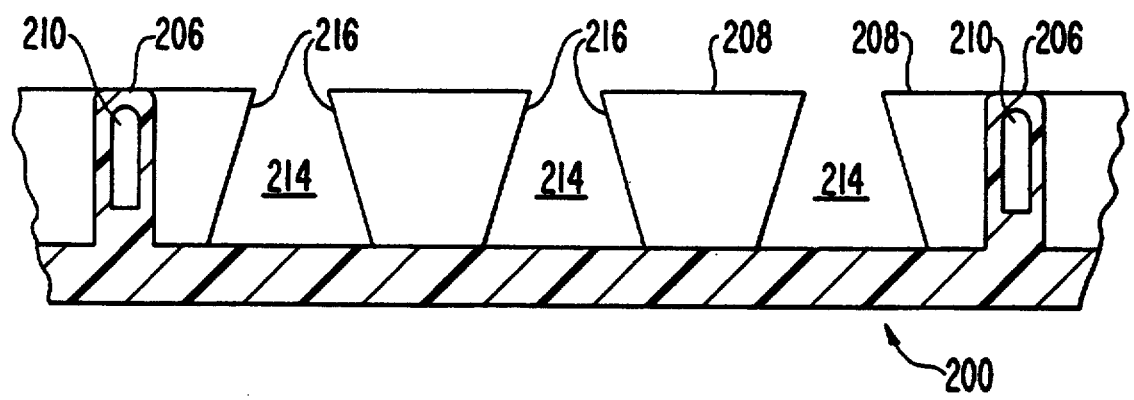
FIG. 12 is a cross section of a liner with projections having a preferred arrangement of dovetail shaped gaps.

FIG. 12 shows a preferred embodiment having three dovetail shaped gaps 214 between intersecting projections 206, 208. The grid created by projections 206, 208 are on three inch centers in both directions, with three dovetail shaped gaps 214 located between intersecting projections in both directions. An advantage provided by this arrangement is the increased shoulder area is produced, increasing the strength of the mechanical lock. However, the number of gaps 214 between intersecting projections could be increased or decreased without departing from the scope of the invention.

To produce a lined structure, a liner mold must be shaped inversely of the desired shape of liner 200, such that when molded, liner 200 has a preformed shape substantially similar to the desired surface to be lined. For example, the liner mold must include impressions which are the same shape and size as liner 200 projections 206, 208. Plastic is then poured into the liner mold and is rotationally molded.

The inherent rotation of the liner mold during the rotational molding process produces apertures 210 in projections 206, 208 because of the bridging phenomenon which occurs in narrow elongated impressions. Liner 200 can be removed from the liner mold once the plastic has adequately hardened. Gaps 214 are then cut into hollow projections 206, 208 perpendicular to their longitudinal axis by using a mill, router, or another similar cutting device.

A mold for producing the lined concrete structure section to be formed must be provided. The mold typically includes an exterior jacket which provides an outer boundary for the section, and an expandable and contractible fitting apparatus which provides support for forming an inner boundary for the section. Expandable and contractible fitting apparatuses which can be used are known in the art. A preferred device is disclosed in U.S. patent application No. 07/700,710 to the same inventor, which is hereby incorporated by reference, because of its expanding and contracting capability which can evenly distribute forces. The fitting apparatus in the above incorporated reference can be utilized in round sections as well as square and rectangular sections.

Once formed, liner 200 is placed around the fitting apparatus with projections 206, 208 facing outwardly. The fitting apparatus is expanded to provide support for liner 200. An exterior jacket is placed around the inversely lined fitting apparatus providing an exterior boundary for the concrete. Concrete is poured inside the exterior jacket, filling the area between liner 200 and exterior jacket. During this pouting step, the concrete enters gaps 214 and apertures 210 on projections 206, 208. The support provided to smooth side 202 of liner 200 by the fitting apparatus facilitates and maximizes the concrete infiltration of gaps 214 and apertures 210.

Upon the setting of the concrete, a mechanical lock is formed between the concrete and liner 200 in two different ways. First, shoulders 216 provided in projections 206, 208 by the dovetail shaped gap 214 trap the concrete between shoulders 216 and lodge 218. Secondly, a mechanical lock is also created by the concrete partially entering into the void spaces or apertures 210 in the projections 206, 208 at dovetail cuts 214. The concrete only partially fills apertures 210 due to air pockets and the settling characteristics of concrete. The concrete inside apertures 210 and between the shoulders 216 and ledge 218 prevent liner 200 from pulling away from concrete surface being lined. The mechanical lock is formed in parallel and perpendicular directions due to the grid system created by the intersecting projections 206, 208, thus creating a more reliable mechanical lock as it can withstand higher pulling and pushing forces on a pounds per square inch basis.

After the concrete settles, the exterior jacket is removed, the fitting apparatus is contracted and the lined concrete element is removed from the fitting apparatus. The lined concrete element may then be shipped to the manhole site for installation.

One skilled in the art would recognize that various modifications can be made to liner 200 without departing from the scope of the invention. For example, although the two sets of projections 206, 208 meet at fight angles, projections 206, 208 could be designed to intersect at an angle other than 90°, or be designed to have more than two sets of intersecting projections. In addition, the spacing 222, 224 between adjacent projections 206, 208 in each group is preferably about 3 inches. However, the spacing between either or both groups of spaced projections 206, 208 could be increased or decreased without departing from the scope of the invention.

Figure 13:
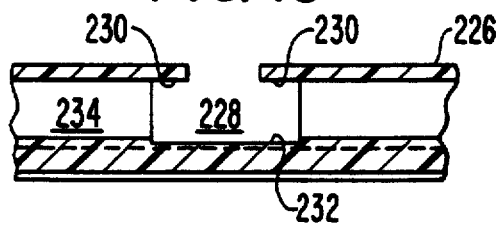
FIG. 13 is a cross section of a liner with projections having alternatively shaped gaps.

As mills and routers are easily adaptable for many different shaped bits, other shaped cuts could easily be formed which also produce an effective mechanical lock. However, it is essential that the cuts produce shoulders which provide a surface to trap the concrete between shoulders 216 and ledge 218 or the base of exterior side 204 of liner 200, depending upon the height of the cut. An alternatively shaped gap is shown in FIG. 13. FIG. 13 shows a projection 226 with an inverted "T-shaped" cut 228 which provide shoulders 230 and a ledge 232. With "T-shaped" gaps 228, the mechanical lock is formed by the setting of the concrete between shoulders 230 and ledge 232, and by the setting of concrete inside apertures 234 of projections 226.

Liner 200 may be of any suitable material which is resistant to attack by the fluids and gases to which it will be exposed. It should be substantially chemically inert, resistant to oxidation, resistant to acids including sulfuric, nitric, chromic, oleic, and stearic, resistant to such alkalis such as sodium hydroxide, calcium hydroxide and ammonia; and resistant to salts of all types. The material should be impermeable to sewage gases and liquids and be resistant to petroleum oils and gases, to vegetable and animal oils, fats, greases, and soaps. It should not be conducive to bacterial or fungus growth.

A suitable material for the liner is a so-called "plastic" by which is meant synthetic and natural resins such as various polymers and elastomers of desired characteristics. Materials which have been particularly effective have been from the poly-synthetic family and specifically include polyethylene (PE) and polyvinylchloride (PVC). However, it is to be understood that either an all-purpose type of lining material or a specific purpose type may be employed and that the invention is not limited to the use of any particular lining material.

In addition to providing a mechanical lock, gaps 214, 228 furnish a path, commonly known in the art as a weep channel, permitting the water to migrate downward rather than collect behind liner 200 and be trapped by the locking projections 206, 208. Without weep channels, trapped fluid accumulates behind liner 200 and forces liner 200 away from the concrete.

Also inherently produced by rotational molding are grooves 236 located on the interior side 202 of liner 200 directly under projections 206, 208. When installed on the manhole bench 115, grooves 236 to help to provide traction to the upper surface to reduce the possibility of slippage by a worker, as compared to a flat, smooth lined surface without any grooves.

The liner according to the present invention can be used to refurbish existing manholes and to protect existing unlined manhole sections, as well as to produce a lined pre-cast concrete structure, as previously described. To refurbish an existing manhole section, a liner which is smaller in diameter than the existing manhole interior wall is lowered with the projections facing outward, into the manhole and secured with respect thereto. Reinforcing steel members can be placed between the liner and the interior manhole wall to provide structural support. Concrete is then poured between the manhole interior wall and the liner with the concrete entering the liner's gaps and hollows. The lined manhole section is complete upon the setting of the concrete. To install the liner in an existing unlined section, the liner is placed inside the section to be lined, whereupon a worker may grout the area between the liner and existing section to permanently secure the liner to the existing section.

Although the liner of the present invention is described for particular use with concrete manhole assemblies, it can also be used for lining other structures, e.g., holding tanks, which are made from inorganic material, including, but not limited to concrete.

Fitting Assembly

Figure 14:
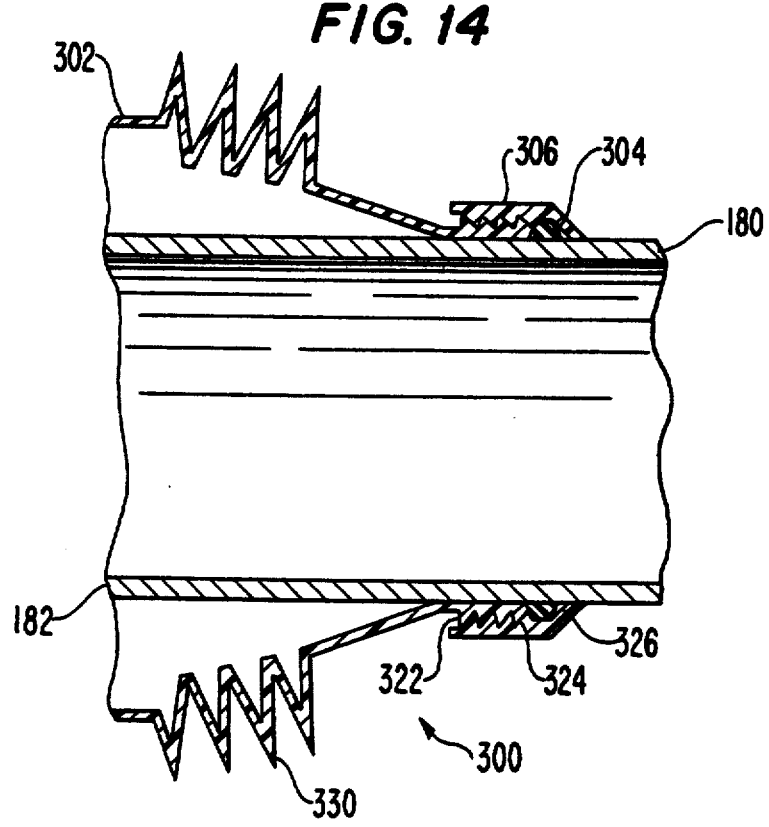
FIG. 14 is a cross section of the pipe attachment portion of the pipe-to-manhole fitting assembly of the present invention.
Figure 9:
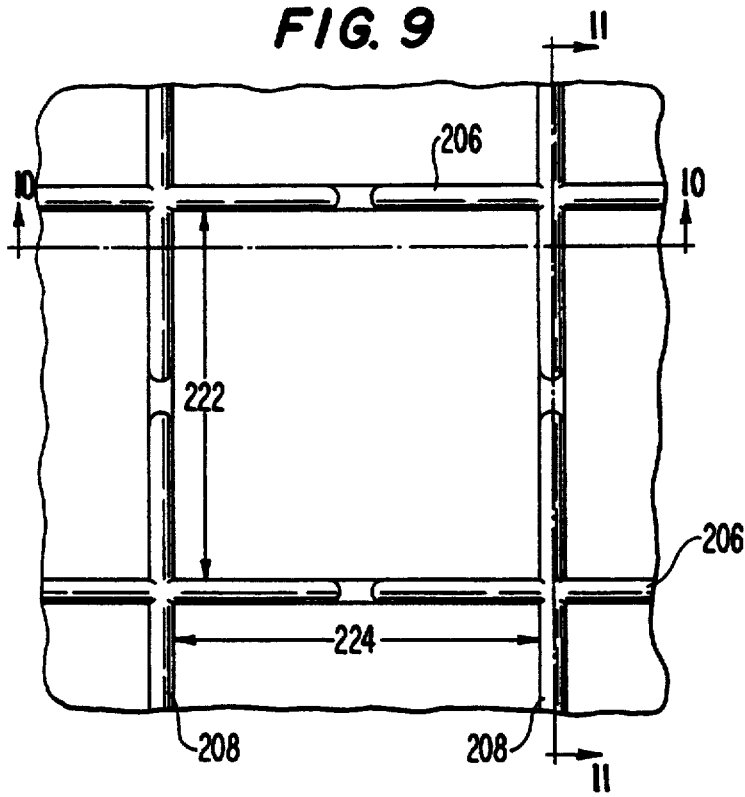
FIG. 9 is a plan view of the liner of FIG. 8.
Figure 10:
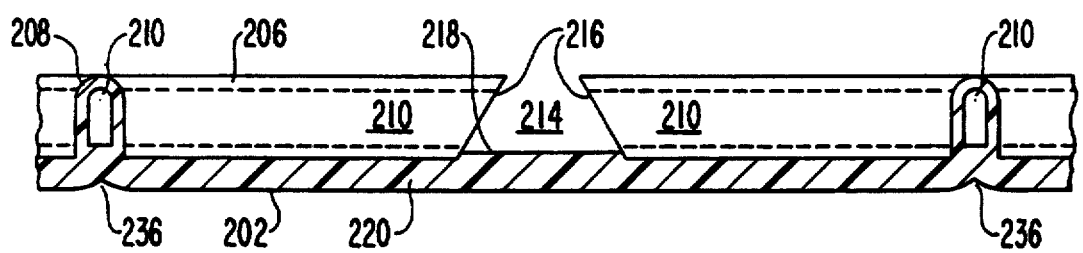
FIG. 10 is a cross section taken along line A—A of FIG. 9.
Figure 11:
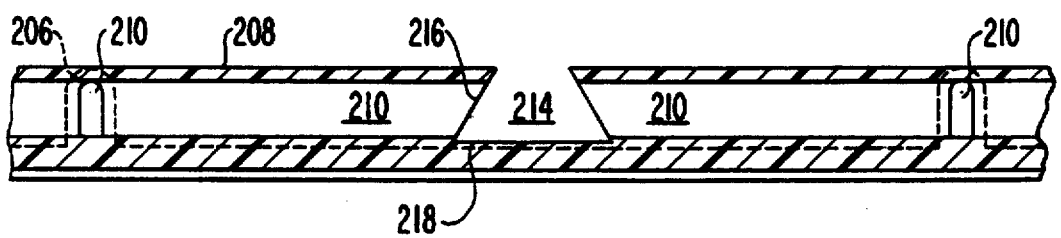
FIG. 11 is a cross section taken along line B—B of FIG. 9.
Figures 15, 16:
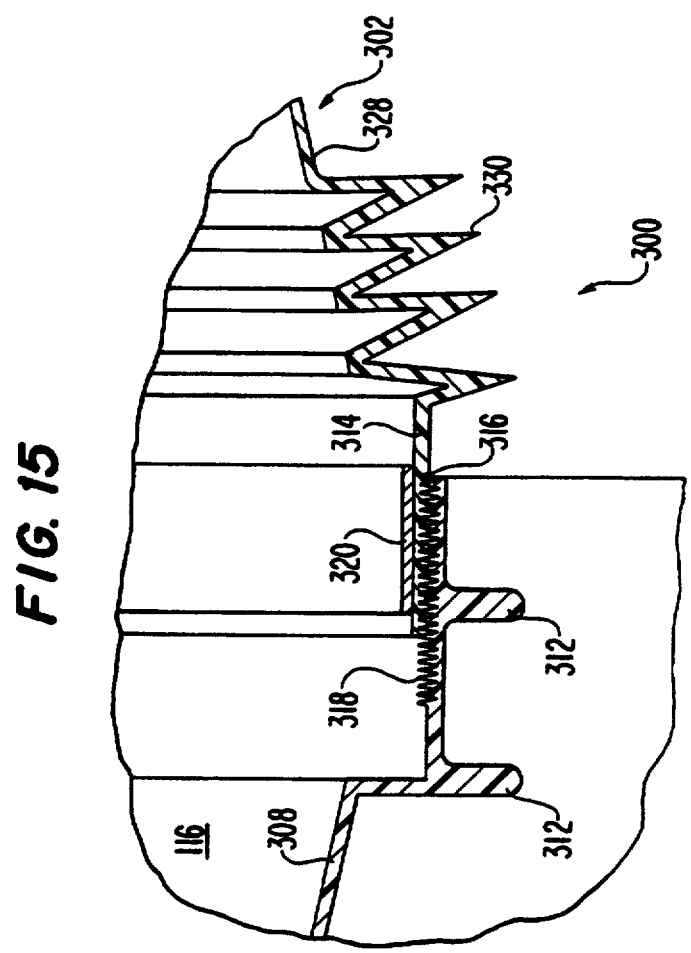
FIG. 15 is a cross section of the manhole attachment portion of the pipe-to-manhole fitting assembly of FIG. 14.
FIG. 16 is a cross section of an alternative embodiment of the manhole attachment portion of the pipe-to-manhole fitting assembly.

FIGS. 14-16 show the fitting assembly 300 of the present invention for joining an inlet or outlet pipe 180, 190 to a manhole opening 116. As shown in FIG. 14, fitting assembly 300 mainly comprises a boot 302, a gasket 304, and a compression nut 306.

When used with a lined manhole assembly, as shown in FIGS. 15 and 16, a polyethylene insert sleeve 308 with a manhole inner flange 310 and locking projections 312 defines the interior of manhole wall opening 116. Inner flange 310 of sleeve 308 is preferably welded to interior liner 200, either by a hot gun, electrical conductors in a manner taught by U.S. Pat. No. 4,586,624 to Shaw, which has previously been incorporated by reference, or in any other manner known in the art for affixing plastic to plastic. However, insert sleeve 308 may also be molded as a unitary part of liner 200, so that no secondary welding process is required. Sleeve 308 and liner 200 are subsequently affixed to the concrete manhole wall 114 in the concrete pouring process as previously discussed in conjunction with the liner 200, with projections 312 providing a mechanical lock between sleeve 308 and manhole wall 114.

At one end of boot 302, a flange 314 extends into the manhole opening 116 for attachment with sleeve 308. In the embodiment shown in FIG. 15, sleeve 308 includes internal threads 318 and flange 314 includes circumferential ridges forming external threads 316 which rotatingly engage internal threads 318 forming a watertight connection between manhole opening 116 and boot 302. For additional reliability, a metal or plastic stiffener ring 320 may be used inside flange 314 to reduce the possibility that threads 316 could disengage from threads 318.

As shown in FIG. 14, compression nut 306 and elastomeric gasket 304 are concentrically located around the exterior of pipe 180 with gasket 304 located closer to the end of pipe 182. Gasket 304 is O-ring shaped and fits tightly around pipe 180 providing a friction lock between pipe 180 and assembly 300. The other end of boot 302 includes external threads 322 for attachment to compression nut 306. Compression nut 306 includes internal threads 324 which threadingly engage external threads 322 of boot 302, and an inner surface 326 which abuts against gasket 304. This arrangement forms a watertight connection between manhole pipe 180 and boot 302.

Once assembled, the entire fitting assembly 300 creates a watertight seal between manhole opening 116 and pipe 180. Further, the seal does not require the use of pipe clamps which many prior art arrangements utilize and which have been known to fail permitting sewage egress.

Intermediate the ends of boot 302 is a tapered section 328 which includes a bellows-like surface 330. Bellows-like surface 330 provides flexibility for fitting assembly 300. As best shown by FIG. 6, the flexibility accorded by fitting assembly 300 allows for a range of movement 332 of 15°, or 7.5° in any direction from a center line of manhole opening 116. This flexibility permits high tolerances between the pipe 180, 190 and manhole opening 116, minimizing difficult installations and cracked or broken pipes due to differential settlement between the pipe and the manhole.

FIG. 16 discloses a slightly different arrangement for attaching boot 302 to sleeve 308. In this arrangement, insert sleeve 308 does not include internal threads but merely a flat smooth interior surface 333. To form a watertight boot 302 to manhole opening 116 seal, flange 314 of boot 302 has a smooth exterior surface 334 which is welded to smooth interior surface 333 of non-threaded insert sleeve 308 by electrical conductors 336 in the manner previously discussed in conjunction with the welding of sleeve 308 to liner 200 or in any manner known in the art for affixing plastic to plastic. The attachment of boot 302 to pipe 180 by nut 306 and gasket 304 is the same as the FIG. 15 embodiment and will not be further described.

Although not pictured, fitting assembly 300 can also be modified to be used in an unlined manhole assembly. Where it is desired to utilize fitting assembly 300 with an unlined manhole assembly, boot 302 would attach directly to the inside of the manhole pipe hole. To accomplish this attachment, boot 302 would include annular ridges on the outside of flange 314 instead of the circumferential ridges 316 shown in FIG. 15 embodiment or the smooth exterior surface 334 shown in the FIG. 16 embodiment. A stainless steel jack ring would be placed inside flange 314 and expanded to create a friction lock between flange 314 and the unlined manhole pipe hole. The attachment of boot 302 to the rest of the assembly would be the same as previously described.

For all embodiments, because the manhole pipe hole is larger than the pipe itself, it may be desired to put filler material in the annular space between the pipe and the opening. The utilization of fillers in the art is well known and may be comprised of a urethane or silicone foam. The filler material helps to keep sewage from collecting in the area between the pipe and the hole due to back flow, turbulence, and other irregular sewage flows.

Boot 302 is preferably molded from polyethylene, but other materials in the art known with similar characteristics may also be used. However, if used in the arrangement as shown in FIG. 16, it must be made of a material having the characteristic capable of being welded to sleeve 308.

Manhole Insert

As previously discussed, reducing storm water flow into sanitary sewer systems via the pickholes in manhole covers can (i) assist overburdened sanitary sewer systems to operate at safe levels, (ii) allow sanitary sewer system operating at safe levels to handle additional sewage, and (iii) prevent contamination problems.

Additionally, rising and falling sewage levels exerts a pump-like behavior attempting to pull air into the manhole when the sewage level is falling and expel sewage gases from the manhole when the sewage level is rising. In order to prevent the generation of substantial sulfide in sanitary sewers, the oxygen supply must be sufficient to maintain a reasonable concentration of oxygen in the wastewater. Thus, it is desirable to let the manhole "breathe" permitting the air ingress and sewage gases to egress, because preventing outside air ingress increases sulfide production and hydrogen-sulfate gas concentrations, and preventing sewer gas flow out causes internal pressure buildup leading to physical damage and increased corrosion to the manhole system.

FIGS. 17-21 show a manhole insert 400 which reduces water inflow into the manhole while permitting the manhole to breathe, thus overcoming the aforementioned problems. Manhole insert 400 is removably placed in a manhole opening immediately below a conventional manhole cover 170 with pickholes 172. Manhole insert 400 is a plastic circular "bowl-shaped" member having an upper rim 402 with an outwardly extending flange 404 which rests on a circular support flange 160 embedded into the concrete at the top of manhole 100.

To reduce water inflow into manhole 100 and permit the sanitary sewer system to breathe, insert 400 includes two removable plugs 406, 408 which include external threads 410 and a plastic micron pore-sized semi-permeable material 412 preventing substantial water inflow and permitting gas relief. External threads 410 threadingly engage internal threads of advantageously arranged holes 414, 416 in insert 400 wall. Spaces in the semi-permeable material 412 are small enough to permit water inflow only upon a pressure which is predetermined by the pore size used and large enough to freely permit air and sewage gases to freely flow therethrough.

Plug 406 preferably screws into hole 414 from the concave side of the insert 400 enabling a worker to unscrew plug 406 while the outwardly extending flange 404 is resting on circular support flange 160. Such a design is preferable as maintenance workers desiring access to the manhole do not have to lift and remove an insert heavily weighted down with water. With insert 400 of the present invention, a maintenance worker can unscrew plug 406, let the water drain into manhole 100, and upon drainage, lift and remove insert 400 without the additional weight from water accumulation.

Figure 19:
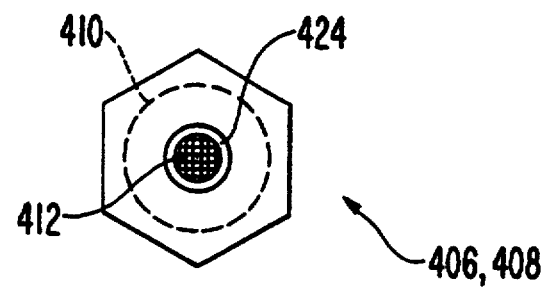
FIG. 19 is a top view of a plug for the manhole insert.

As shown in detail in FIGS. 18 and 19, each portion of semi-permeable material 412 is the center section of plug 406, 408. The designed pore size of the semi-permeable material is such that the spaces within the semi-permeable material permit water inflow only upon a pressure equivalent to the pressure caused by water accumulation of a height approximately equal to or greater than $h_2$. Therefore, the spaces of semi-permeable material are too large to prevent the penetration of sewer gases and only permit water flow therethrough upon water accumulation of $h_2$ height thereabove.

As previously described, insert includes two plugs 406, 408, each with a semi-permeable portion 412. A bottom plug 406 is located at the insert 400 bottom and an upper plug 408 is located higher up on the sidewall at least a distance $h_2$ from semi-permeable portion 412 of bottom plug 406. The purpose of bottom plug 406 is to permit restricted water inflow at the previously described pressure due to excessive water accumulation. The purpose of upper plug 408 is to permit outside to air to enter manhole 100 and to permit sewer gases to exit manhole 100. The manner in which insert 400 achieves these purposes by this plug arrangement is made apparent from the operation of insert 400, which is more fully described hereinafter.

Three compressible ting members 418 are integrally molded to the lower side of outwardly extending flange 404 of rim 402 such that the weight of manhole cover 170 upon insert 400 is sufficient to compress ting members 418 and prevent water from entering manhole 100 around the insert periphery. If desired, compressible ting members 418 can be replaced by sealing material adhered to, or a gasket placed under, outwardly extending flange 404 to perform the same function.

In operation, precipitation or rainwater cannot enter manhole 400 from insert periphery because of the peripheral seal created by ring members 418. Rainwater entering through pickholes 172 of manhole cover 170 collects inside insert 400 due restricted flow area of semi-permeable portions 412. If the water accumulation inside insert 400 is less than level B, no water will enter manhole 100 through the insert 400. Upon water accumulation in excess of level B, water will enter manhole 100 through semi-permeable portion 412 of bottom plug 406.

In a heavy storm or periods of excessive precipitation, the total water flow into manhole 100 is dramatically reduced by bottom plug 406. This occurs because the restricted flow area of the semi-permeable portion 412 first causes the water to accumulate until the water level reaches level B. Although water flow into the manhole occurs when the water accumulation is in excess of level B, the nature of the semi-permeable portion 412 with the restricted flow area causes the inflow of water into the manhole to be at a substantially slower rate than the water entering insert 400 through pickholes 172. This causes the water level inside insert 400 to rise. Assuming continued precipitation, the water level inside insert 400 will continue to rise until insert 400 is filled and the water level reaches the manhole cover 170. This prevents water flow through the pickholes 172 at any rate higher than the restricted flow rate into manhole 100 through the semi-permeable portions 412. Water will only enter through upper plug 408 if the water accumulation level reaches level C. However, the system may be designed such that the ratio between $h_2$ and the depth of insert 400 causes level C to be above manhole cover 170. In such a case, no water will enter manhole 100 through upper plug 408.

Upon the termination of precipitation, the water inside insert 400 continues to drain through semi-permeable portion 412 into manhole 100 until the water level reaches level B and semi-permeable portion 412 of bottom plug 406 prevents further water inflow. Water accumulation above bottom plug 406 creates a pressure differential upon upper side of semi-permeable portion 412 of bottom plug 406 preventing the outflow of sewer gases through bottom plug 406. However, the outside air will freely enter manhole 100 and the sewer gases will freely exit manhole 100 through semi-permeable portion 412 of upper plug 408 because there is no water accumulation thereabove and semi-permeable portion 412 freely permits sewer gases and air to pass therethrough.

Insert 400 also includes a sediment collection space 420 which prevents the semi-permeable portion 412 of bottom plug to become blocked by sediment, e.g., sand, dirt, which enters insert 400 through pickholes 172. Sediment collection space 420 is inherently created by the height of the lip 421 around hole 414 and the thickness 422 of the top of bottom plug 406. In operation, sand or other debris which falls into insert 400 through pickholes 172 will slide by gravity along the concave insert wall into sediment collection space 420 keeping semi-permeable portion 412 of bottom plug 406 unobstructed. Only upon debris accumulation in excess of level A, i.e., a height of $h_1$ debris, can semi-permeable portion 412 potentially become blocked. If desired, a larger sediment collection space 420 can be created by increasing the height of lip 421 or the thickness 422 of the top of bottom plug 406.

In one preferred embodiment, The semi-permeable material is preferably a 5 by 5 micron mesh, which creates spaces permitting water inflow only upon a pressure of approximately 0.50 pounds per square inch. As water has a density of 0.036 pounds per cubic inch, water will enter manhole 100 through semi-permeable portion 412 of bottom plug 406 upon the accumulation of 13.85 inches of water ($h_2$) above semi-permeable portion 412 of bottom plug 406. If level A ($h_2$) is designed to be 2.0 inches, upper plug 408 should be at least 15.85 inches from the bottom of insert permitting the sewer to breathe.

Although two semi-permeable portions 412 are disclosed each as the center of a plug, any number of semi-permeable portions may be used, and may be attached to insert 400 in numerous different ways. Semi-permeable portions may also be integrally molded with the insert, or a separate piece sintered, welded as shown by weld area 424 in FIG. 19, or adhered in any suitable manner to an insert having a hole of similar size and shape as the semi-permeable portion. Additionally, semi-permeable portion may be located in other advantageous positions on insert and may take various sizes or shapes, as desired. Further, a small hole or holes may be placed on the insert wall in lieu of the semi-permeable portions to create the reduced flow sections.

As shown in FIG. 21, insert 400 is preferably shaped to have a deep arcuate lower profile. This profile exceeds the path of spin of manhole cover 170 resting upon the circular supporting flange 160. This profile prevents the manhole cover 170 from striking and possibly damaging insert 400 if the manhole cover 170 is rolled to a vertical position. This feature is important to the longevity of insert 400 because manhole covers 170 are frequently spun to a vertical position for subsequent removal.

The plastic which comprises insert 400, including semi-permeable portion 412, is preferably rotationally molded polyethylene or polyvinylchloride. However, one skilled in the art would realize that other suitable materials and forming methods may also be used.

Channel Forming Apparatus

The present invention discloses two different channel forming devices used in conjunction with a base section forming apparatus. A first channel forming device 500, as shown by FIGS. 22–39, is used for manufacturing base sections having a single channel accommodating only one inlet pipe, while a second channel forming device 600, as shown by FIGS. 40–46, is used for manufacturing base sections having a plurality of channels accommodating two, three or more inlet pipes.

According to the present invention, a manhole base section 100 is constructed by filling or pouring concrete into a form in which manhole base section 100 is formed in an upside down position so that floor 112 of base section 100 is at the top. The bench 115 of floor 112 is downwardly sloped from the bench perimeter to the center so that water and sewage will drain into the formed channel or channels and not remain on the bench 115. Generally, manholes are approximately 48" in diameter. For such a manhole, interior floor 112 would be approximately 48" in diameter, and its bench 115 would have a slope of approximately ⅛ fall per foot from the edge to the center.

Figure 22:
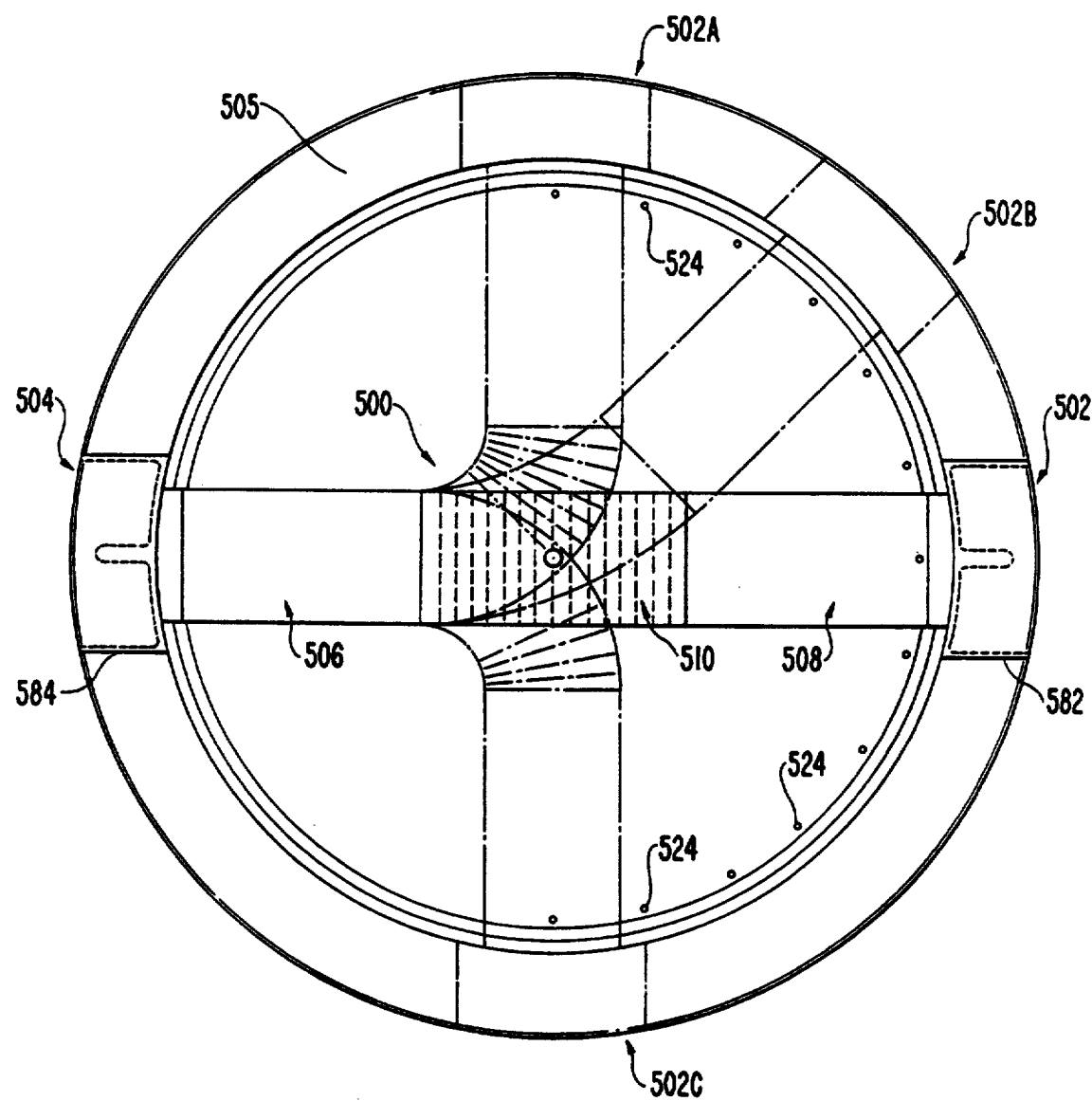
FIG. 22 is a top view of the manhole base section forming apparatus with a channel forming device for forming a single channel.

FIG. 22 shows a top plan view of the single channel forming device 500 of the present invention. As shown in FIG. 22, inlet 502 is diametrically opposite from outlet 504. However, according to the invention, a channel can be formed in which inlet 502 is selectively positioned at any desired angle from approximately 90°–270° with respect to outlet 504. For example, inlet 502 could be positioned at a 90° angle with respect to outlet 504, as shown by dotted outline at 502A. Alternatively, inlet 502 could be positioned at either a 135° angle with respect to outlet 504, as shown in dotted outline at 502B; or inlet 502 could be positioned at a 270° with respect to outlet 504, as shown in dotted outline at 502C. Indeed, according to the present invention, the inlet location can be selectively located at any position within the angular range of approximately 90° through 270° with respect to the outlet position. Of course, the terms outlet and inlet as used herein are only relative and indeed reference number 504 could refer to the inlet position and reference numeral 16 could refer to the inlet position and reference numeral 502 could refer to the outlet position.

Figure 23:
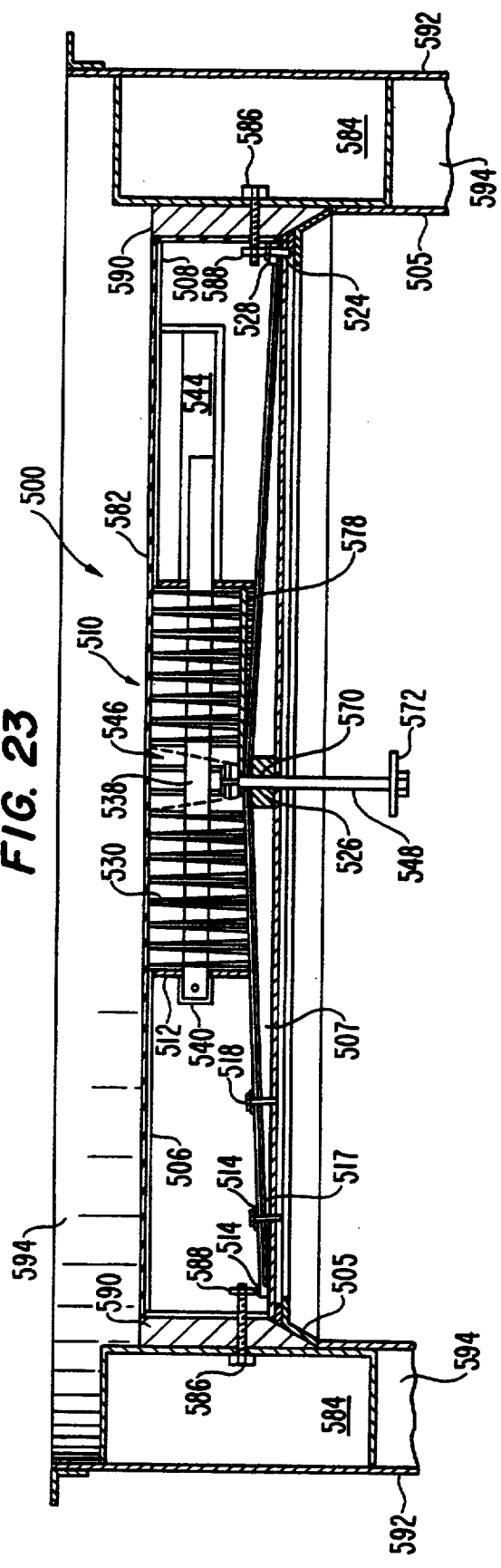
FIG. 23 is a cross section of the manhole base forming apparatus with a channel forming device of FIG. 22 taken along the center of the channel forming device.
Figure 24:
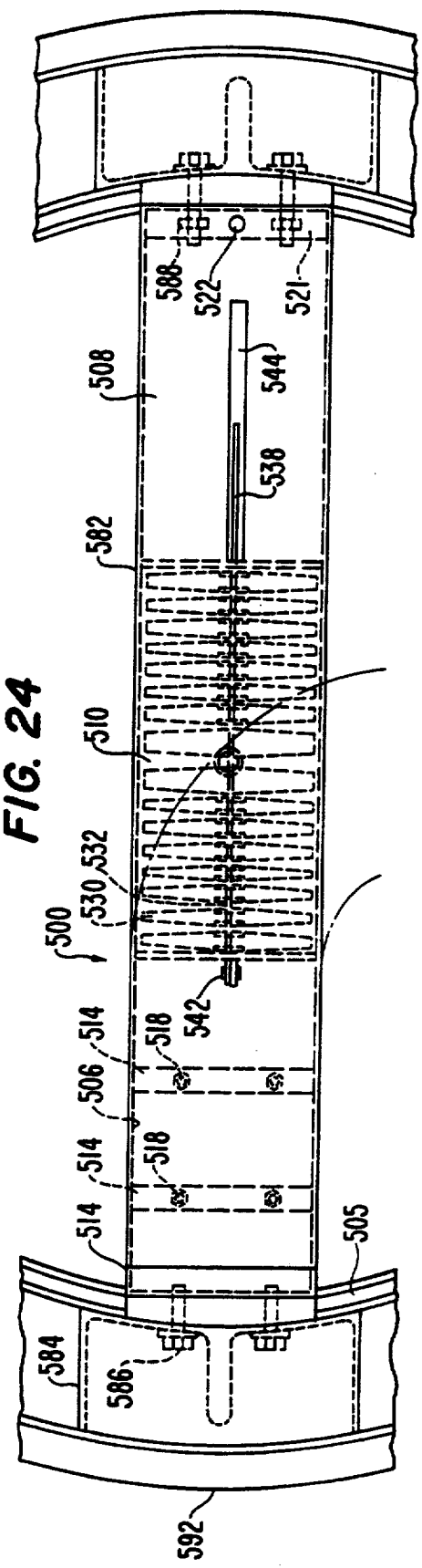
FIG. 24 is a top view of the channel forming device of FIG. 22.

As shown generally in FIGS. 23–24, channel forming device 500 of the present invention is placed onto a top surface 507 of an interior manhole form 505 for forming base section 110 with floor 112 and channel 113. Top surface 507 is conically shaped providing the sloped surface to bench 115. Channel forming device 500 includes a stationary or fixed rigid channel forming member 506 and a movable rigid channel forming member 508 laterally spaced from fixed channel forming member 506. A flexible channel forming member 510 connects fixed channel forming member 506 to movable rigid forming member 508 to thereby form a continuous channel.

Figure 25:
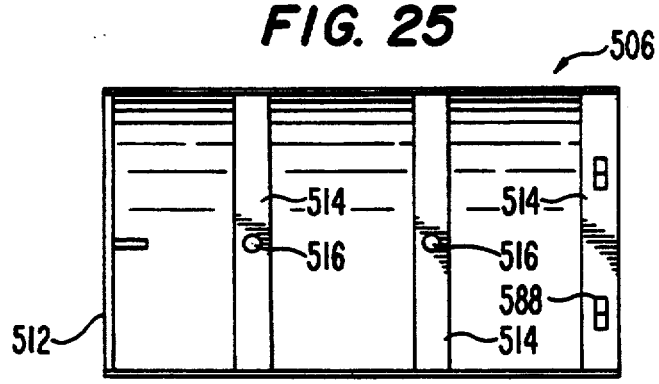
FIGS. 25-27 are a top sectional view, a cross section, and an end view, respectively, of the fixed rigid channel forming member.
Figure 26:
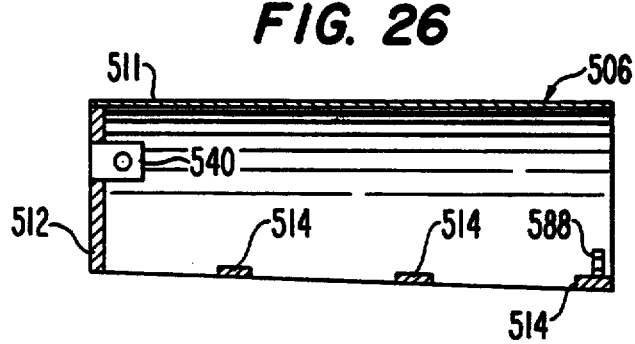
Figure 27:
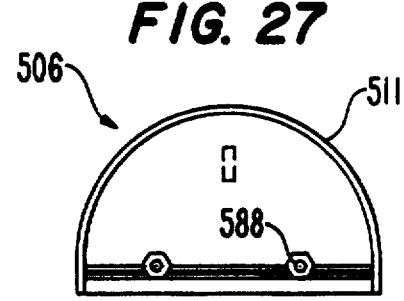

Fixed channel forming member 506, as shown in FIG. 25–27, is a rigid member of generally hemispherical shape, and includes an upper casing member 511, an end plate 512 and transverse bars 514. Upper casing member 511 provides a generally curved upper support surface, while end plate 512 and transverse bars 514 provide rigidity and shape to fixed channel forming member 506. Transverse bars 514 include holes 516 which align with holes 517 in top surface 507 of interior manhole form 505, such that screws 518 may fixedly attach fixed channel forming member 506 to interior manhole form 505.

Figure 28:
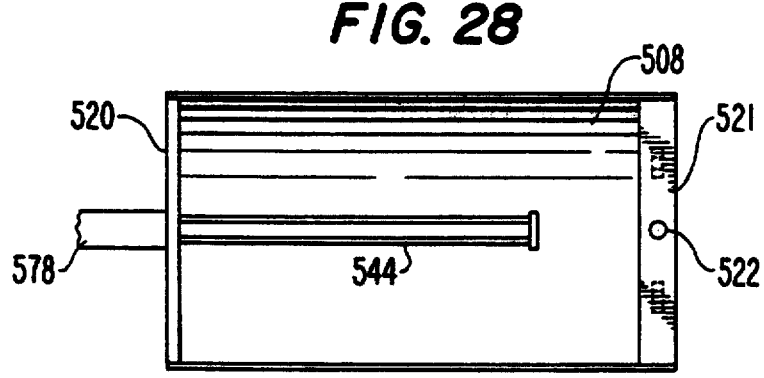
FIGS. 28-30 are a top sectional view, a cross section, and an end view, respectively, of the movable rigid channel forming member.
Figure 29:
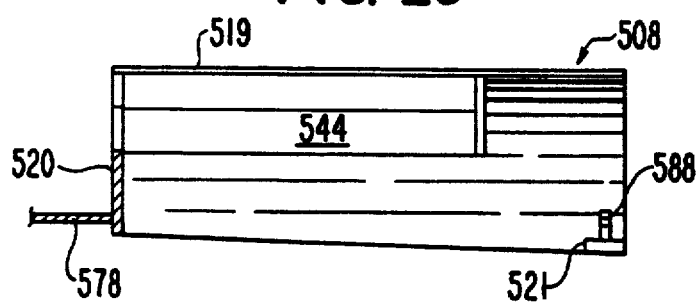
Figure 30:
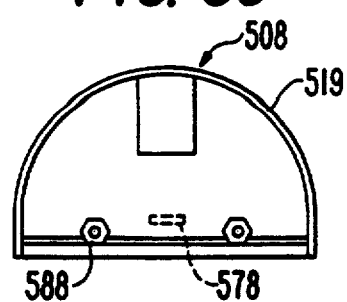

Movable channel forming member 508, as shown in FIGS. 28–30, is generally of a similar construction having an upper casing member 519 and an end plate 520, however, it only includes a single transverse bar 521 located on its lower peripheral surface. Transverse bar 521 is shown as having a single centrally located vertical hole 522. As best shown in FIG. 22, top surface 507 of interior manhole form 505 includes angularly disposed holes 524 which are radially spaced from a vertical hole 526 at the center of interior manhole form 505. Each hole 524 corresponds to a potential angular setting for movable channel forming member 508 with respect to fixed channel forming member 506. Once rotated into the desired angular disposition, movable channel forming member 508 may be stabilized with respect to interior manhole form 505 by the insertion of an alignment pin 528 placed through vertical hole 522 and an aligned angularly disposed hole 524. It should be noted that the angular spacing between settings can be adjusted by the number of holes in top surface 507 of interior manhole form 505. While it is possible to have incremental spacings of 1° or less, it may be more practical to have incremental spacing of the more commonly used configurations, i.e., 5° or 10°. Further, if more than one vertical hole 522 on transverse bar 521 is desired, the number of holes per angular configuration on top surface 507 must also be increased to accommodate the appropriate number of pins 528.

Figure 45:
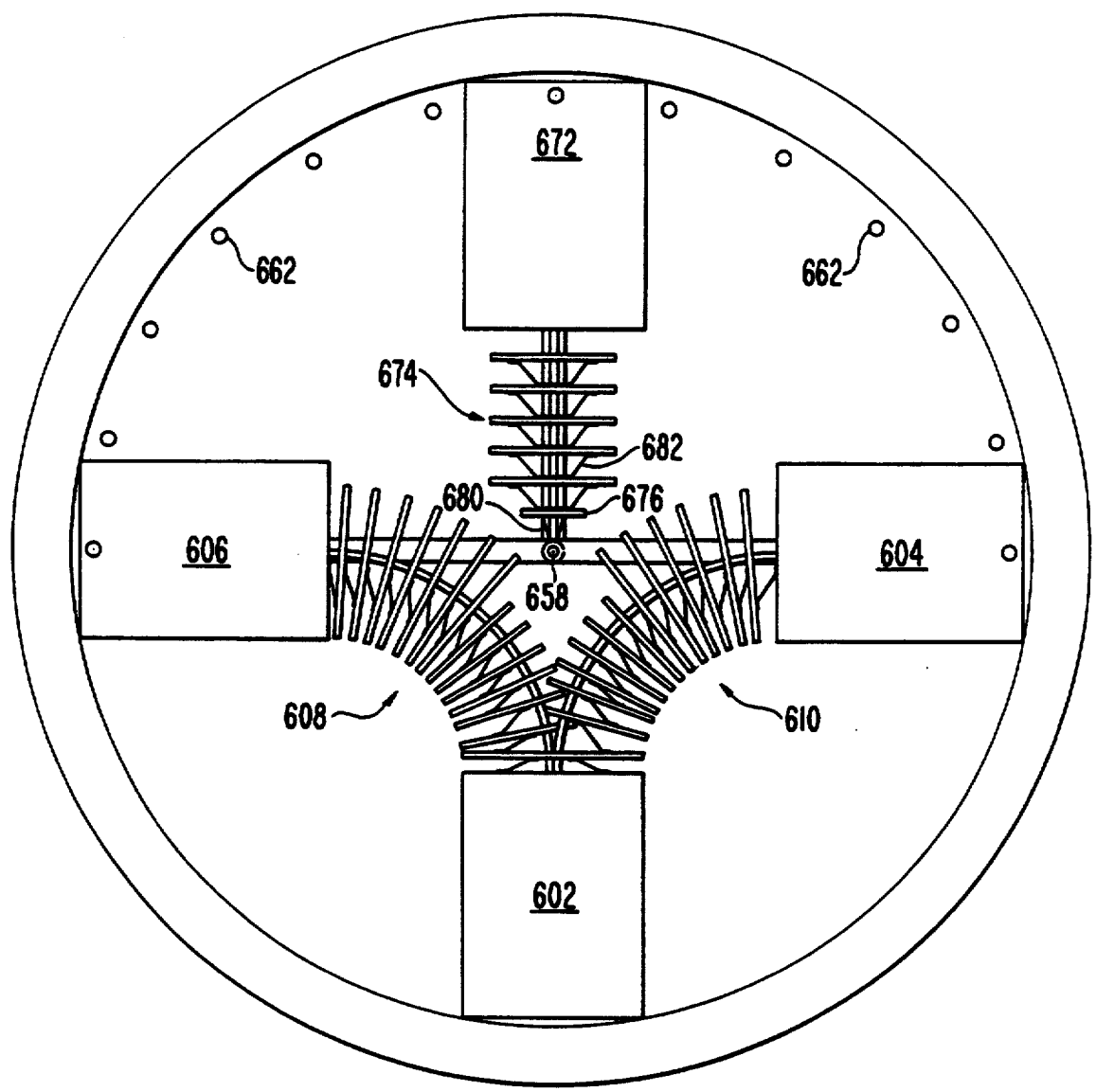
FIG. 45 is a top view of the manhole base forming apparatus with a channel forming device for forming a plurality of channels, shown as modified for forming three channels.

Flexible channel forming member 510 includes an internal supporting structure comprising a plurality of metal or hard rubber disks 530. As shown, fourteen such disks are used in the preferred form of the invention. As shown in FIG. 23, disks 530 are of different dimensions to compensate for the curvature in top surface 507. Disks 530 are preferably separated by springs 532 to provide additional resiliency for flexible channel forming member 510. Springs 532 are shown as coil springs, however, the preferred spring embodiment would utilize leaf springs 680, 682, as shown in FIG. 45.

Figure 32:
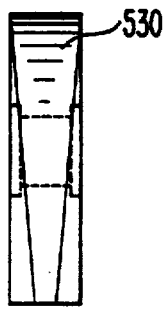
FIGS. 31-33 are front, side, and top views, respectively, of a disk included in the flexible channel forming member.
Figure 31:
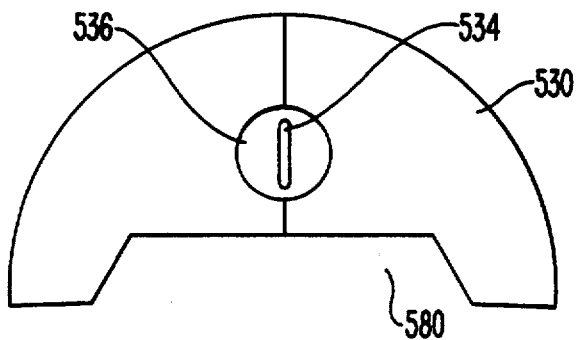
Figure 33:
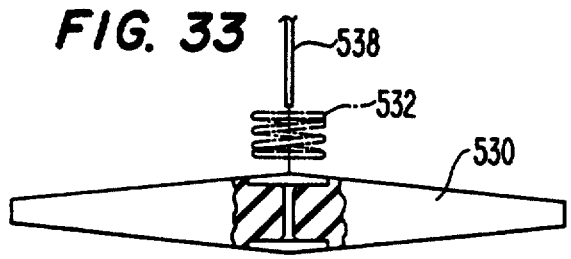

Each disk 530, as shown in FIGS. 31-33, further includes a centrally located longitudinally extending aperture 534. Aperture 534 may be created by forming a separate guide channel element 536 having an aperture 534 into each disk 530, or may simply be created by designing a void creating aperture 534 into each disk 530. A resilient center blade assembly 538 extends through aperture 534 in each spaced disk 530. A blade mounting plate 540 is provided in fixed channel forming member 506 connected to end plate 512. A bolt 542 connects resilient center blade assembly 538 to blade mounting plate 540. The other end of resilient center blade assembly 538 resides within an elongated slot or channel 544 within movable channel forming member 508 such that resilient center blade assembly 504 biases movable channel forming member 508 towards a position in line or 180° from fixed channel forming member 506. Resilient center blade assembly 538 also functions to hold disks 530 and springs 532 together so that it is bendable like a spine.

Resilient center blade assembly 538 preferably comprises three horizontally laminated blades attached together by bolt 542 at blade mounting plate 540. The use of a plurality of blades increases the flexibility of flexible channel forming member 510 permitting it to bend easier. Although using one blade to compose resilient center blade assembly 538 is possible, more than one blade is preferred for enhanced flexibility.

A pivot assembly 546, shown in FIGS. 23 and 34-36, is located within flexible channel forming member 510 and includes a guide rod 548 and a pivot disk 550. Pivot disk 550 includes a C-shaped outer member 552 and welded thereto is an upper bracket 554 and a lower bracket 556. Lower bracket 556 includes a centrally spaced horizontal channel 558 for accommodating guide rod 548. The vertical spacing between upper and lower bracket 554, 556 defines two spaced a laterally slot 560 on both sides of horizontal channel 558. Slots 560 have a sloped profile conforming to top surface 507 of interior manhole form 568 so that as movable channel forming member 508 of channel forming device 500 pivots to any one of the positions between 90° to 270°, the center elevation of the device 500 remains relatively constant. Guide rod 548 is a T-shaped pin extending downwardly through channel 558 and an aperture 570 in sloped top surface 507, and is clamped with respect to the interior manhole form 505 schematically indicated at 572. Guide rod 548 at an upper end thereof includes laterally extending portions 574 which are located within slots 560 permitting movement of pivot disk 550 with respect thereto. Thus, this arrangement, allows movable channel forming member 508 to pivot about rod 548 at a fixed radius. A magnetic, electromagnetic, or hydraulic device may be provided to help releasably clamp guide rod 548 to manhole inform 505 to facilitate the installation process.

Pivot disk 550 also includes vertical members 576 mounted between upper bracket 554 and C-shaped outer member 552. The spacing of vertical members 576 defines a central aperture 578 therebetween for accommodation of resilient center blade assembly 538.

To adjust movable channel forming member 508 with respect to fixed channel forming member 506, an angular force is manually applied to movable channel forming member 508. Movable channel forming member 508 is pivoted about guide rod 548 until the channel forming device 500 is properly positioned. The pivotal motion also causes pivot disk 550 to axially move along, and rotate about, guide rod 548, forming a smooth channel support surface between fixed channel forming member 506 and movable channel forming member 508.

A spacer bar 578 is fixedly mounted at one end to the bottom inner portion of movable channel forming member 508 and is rotationally mounted at the other end to guide rod 548. The rotational motion is permitted due to a hole (not pictured) located at the inner end of the spacer bar 578 which accommodates the shaft portion of guide rod 548. Spacer bar 578 assures the proper radial spacing of movable channel member 508 with respect to manhole inform 505, preventing radial misalignment between holes 522, 524. Once properly positioned, the assembly is locked by placing pin 528 through aligned holes 522, 524. Disks 530 do not interfere with spacer bar 578 because each disk 530 includes a stepped-up middle portion 580 at its bottom which permits spacer bar 578 to reside therewithin without hindrance.

As shown in FIG. 23, disks 530, fixed channel forming member 506, and movable channel forming member 508 are designed to provide an upper horizontal surface. The upper horizontal surface forms a horizontal flow path on the bottom of the formed troughs from the inlet pipe to the outlet pipe, which is commonly referred to as the invert 117. However, it should be noted that some design engineers may prefer manholes to provide inverts 117 having a positive flow or fall which is accomplished by designing the disks 530, fixed channel forming member 506, and movable channel forming member 508 such that their tops create a continuous slant from the outward end of fixed channel forming member 506 down to the outward end of movable channel forming member 508. One preferred degree of slope provides a fall of 0.025 feet per foot of length. The slope design of the invert 117 is typically a function of regional sewer requirements and specific land parameters. An example of a sloped upper assembly is shown in FIG. 41 which depicts a sloped invert 117 on the multiple inlet channel forming embodiment 600.

In manufacturing an unlined manhole base section, channel forming device 500 is first placed into position on top surface 507 of interior manhole form 505, inserting guide rod 548 downwardly through the hole in spacer bar 578 and the hole 570 in interior manhole form 505, and subsequently clamping guide rod 548 to support 572 and bolting fixed channel forming member 506 to holes 517 in top surface 507 of interior manhole form 505. A manual lifting force is used to pivot the movable channel forming member 508 about guide rod 548 until the channel forming device 500 is positioned for the desired angular relationship between the inlet and outlet openings for the manhole pipe. Movable channel forming member 508 is thereafter secured to interior manhole form 505 by inserting pin 528 through aligned holes 522 and 524.

Figure 37:
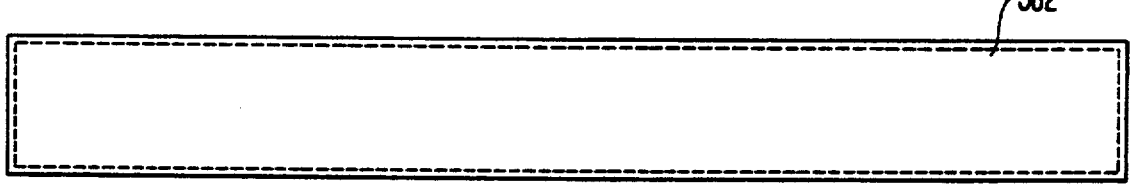
FIGS. 37-39 are side, end, and top views, respectively, of the elastomer sleeve.
Figure 38:
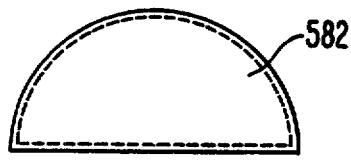
Figure 39:
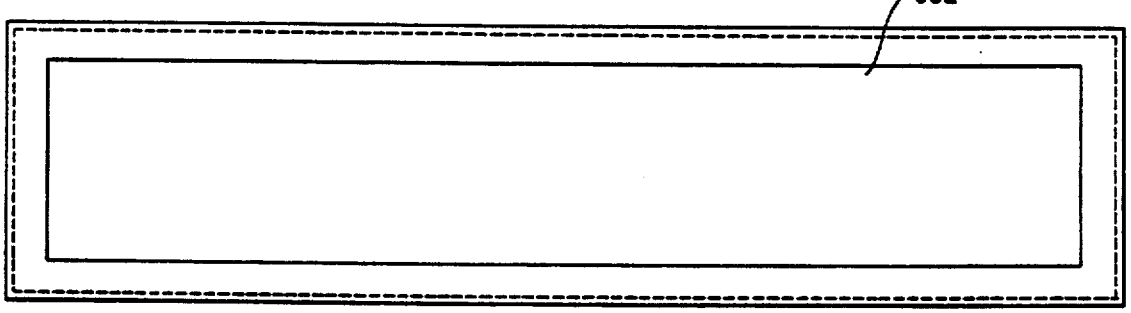

An elastomer sleeve 582, shown in FIGS. 37-39 is placed to cover the entire channel forming device 500. Preferably the elastomer sleeve 582 is a molded urethane or similar type sleeve that is approximately 33" long and place upon channel forming device 500 in a stretched condition. The stretched sleeve 582 provides a smooth interior wall surface for the channel to facilitate sewage flow. However, the dimensions of elastomer sleeve 582 will vary in accordance with the size of channel forming device 500 such that it fits around both rigid channel forming members 506, 508 and flexible channel forming member 510.

A hole former 584 is fixed to the outer ends of fixed rigid channel forming member 506 and movable rigid channel forming member 508 to form the inlet and outlet openings 116 in base section 110 of the manhole 100 at appropriate positions. Hole formers 584 are typically made from fiberglass, steel, or a hard elastomer and have a diameter appropriately matched to accommodate the inlet and outlet sewer pipes being used. As shown more specifically in FIG. 23, a first hole former 584 is connected to fixed channel forming member 506. A bolt 586 connects hole former 584 to fixed channel forming member 506. Bolt 586 may be secured within a nut 588 welded to a transverse bar 514, 521. Transverse bars 514, 521 provide structural form and integrity to channel forming members 506, 508 and facilitate connecting the channel forming device 500 within a mold assembly for forming the manhole base section 110. A hard rubber, fiberglass, or metal transition piece 590 may be interposed between hole former 584 and rigid channel forming members 506, 508 to facilitate the connection between hole former 584 and rigid channel forming member 506, 508.

An exterior manhole jacket 592 is placed around channel forming device 500 and interior manhole form 505 to provide an exterior shell for forming the manhole base section 110. Concrete 594 is thereafter poured over channel forming device 500 and between manhole inform 505 and exterior jacket 592.

Once the concrete has set, exterior jacket 592 is removed from the concrete 594. The completed concrete base is lifted off interior manhole form 505 and channel forming device 500, and is shipped to the manhole site for installation.

If a lined manhole base section is desired, a premolded U-shaped liner section of the type shown in FIGS. 8-13, would be used in lieu of elastomer sleeve 582, hole formers 584, and transition pieces 590. Additionally, interior manhole form 505 is preferably an expandable and contractible fitting apparatus.

Fixed channel forming member 506 of channel forming device 500 is placed and clamped onto interior manhole form 505 in the same manner described in making an unlined base section. Movable channel forming member 508 is adjusted and secured for the desired angular relationship between the inlet and outlet openings for the manhole pipe, also in the same manner as previously described.

The liner section would be formed as previously described in this application and placed over channel forming device 500 and interior manhole form 505 with projections 206, 208 facing outward. Liner 200 would include holes corresponding to the intended pipe junctions. Insert sleeves 308, as shown in FIGS. 15 and 16 would be welded to holes in the liner section 200 to create channels which subsequently form holes 116 in the manhole base section wall for the pipes.

An exterior manhole jacket 592 is set up around channel forming device 500 and interior manhole form 505 as previously described. If interior manhole form 505 is an expandable and contractible fitting apparatus, it is expanded applying radial pressure to liner 200 creating a stronger adhesion between concrete 594 and liner 200. Concrete 594 is poured and permitted to set in the same manner as previously discussed. Once concrete 594 has set, exterior jacket 592 is removed from the concrete 594 and if manhole inform 505 is an expandable and contractible fitting apparatus, it is contracted facilitating the removal of lined base section 110 therefrom. The completed lined concrete base section 110 is lifted off interior manhole form 505 and channel forming device 500, and is shipped to the manhole site for installation.

FIGS. 40-46 show the channel forming device 600 used for accommodating multiple inlets. The device configured to form a double inlet-single outlet channel is shown in FIGS. 40-44, i.e., two channels 113, while FIGS. 45-46 show the device configured to form a triple inlet-single outlet channel, i.e. three channels. Although not pictured, the device can also be configured to form more than three inlets with a single outlet.

The description of device 600 will be in conjunction with forming a lined manhole base section 110. However, the device of the present invention could also be used to form an unlined base 110, in a manner similar manner to the description of forming an unlined base section with the single inlet device 500. In the situation of forming an unlined base with the multiple inlet embodiment 600, a specially shaped elastomer sleeve would be required to correspond to the desired number of inlet pipes.

Figure 40:
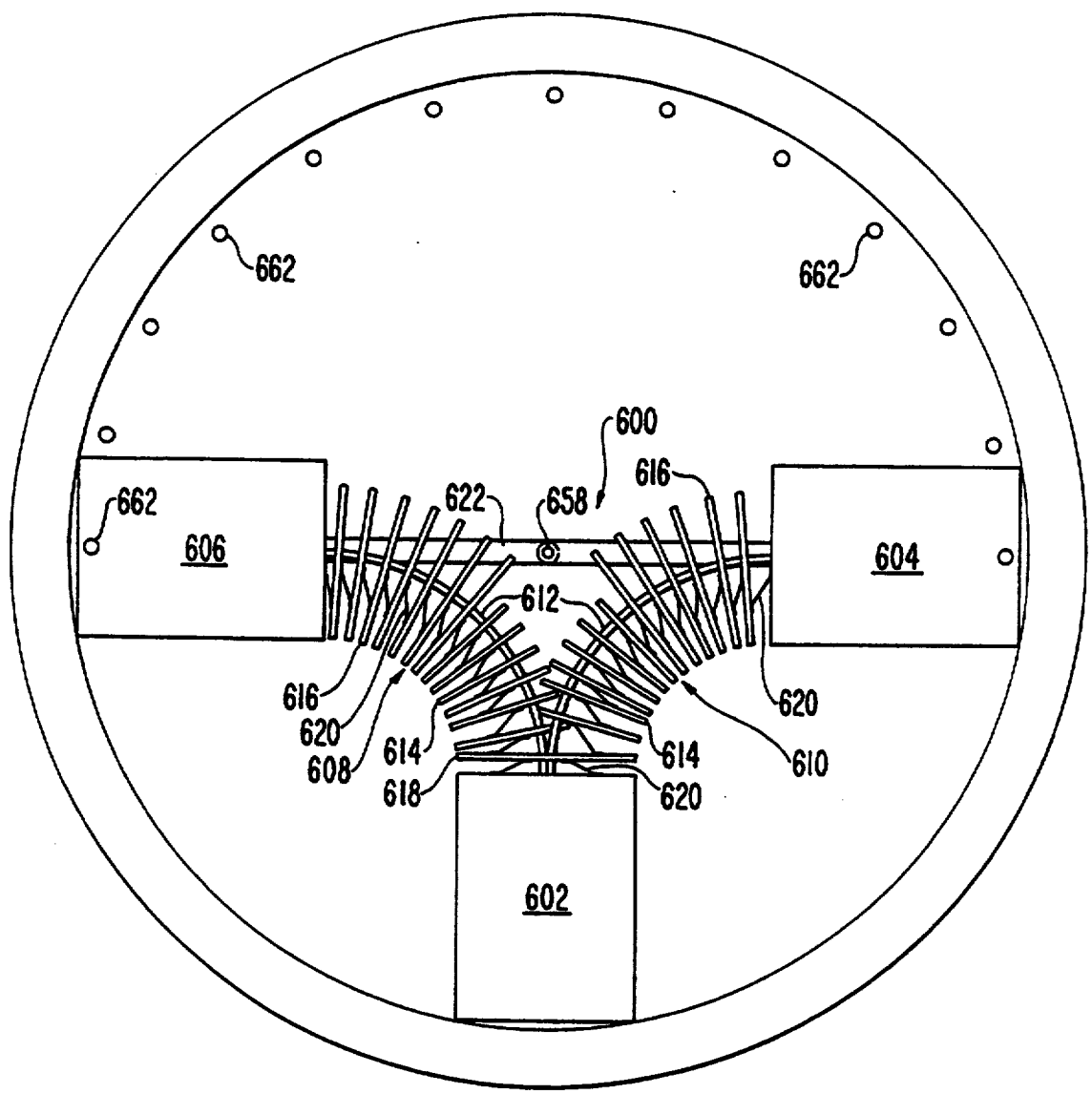
FIG. 40 is a top view of the manhole base section forming apparatus with a channel forming device for forming a plurality of channels, shown for forming two channels.

Channel forming device 600, as shown in FIG. 40 forms a double inlet-single outlet channel 113 in base section floor 112. In other words, it forms two flow channels each originating at two separate inlet pipes 180 and feeding into a common outlet pipe 190. The device is capable of forming two inlet channel sections each which are disposed at any angle between 90° and 270° from the outlet channel section. The double inlet-single outlet primarily includes a single fixed channel forming member 602, two identical movable channel forming members 604, 606, and two flexible channel forming members 608, 610, each connecting a movable channel forming member 604, 606 to fixed channel forming member 602.

Fixed channel forming member 602, and movable channel forming members 604, 606 are essentially the same as the fixed and movable channel forming members 506, 508 described in conjunction with the single inlet channel forming device 500. However, flexible channel forming members 608, 610 have many differences from their single inlet counterpart 510.

Each flexible channel forming member 608, 610, includes resilient center blade assemblies 612, disks 614, 616, 618, springs 620, and spacer bars 622, not unlike their single inlet counterpart 510. However, unlike their single inlet counterpart 530, disks 614, 616 are designed to interdigitate providing adequate accommodation for more than one inlet.

There are three types of disks 614, 616, 618 arranged within flexible forming member 608, 610. The first type of disk used is referred to as a joining disk 618, one of which is used in this embodiment. The second type of disk used is referred to as a narrow disk 614, twelve of which are used in this embodiment, six for each flexible channel forming member 608, 610. The third type of disk used is referred to as a finger disk 616 because of its resemblance to a hand with a finger pointing outward. Fourteen finger disks 616 are used in this embodiment, seven for each flexible channel forming member 608, 610.

Figure 42:
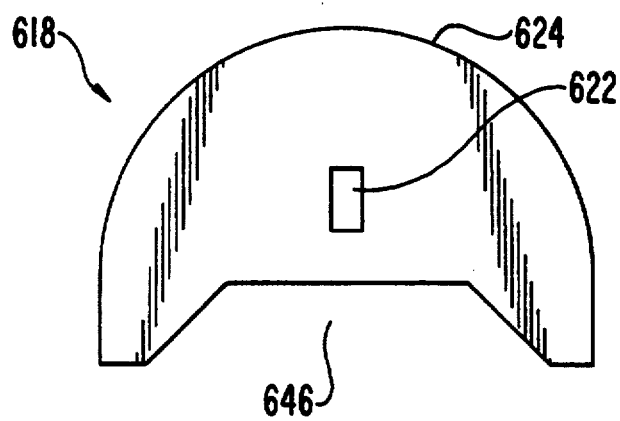
FIG. 42 is a front view of the joining disk.

Joining disk 618, as shown in FIG. 42, includes a centrally located aperture 622 and an arcuate upper surface 624. Joining disk 618 is located adjacent fixed channel forming member 602 and as a first union between flexible forming members 608, 610. Two half spacer springs 620 are positioned between fixed channel forming member 602 and joining disk 618 maintaining joining disk 618 a distance from fixed channel forming member 602. In lieu of two half spacer springs 620, a full spacer spring can be utilized, as shown in conjunction with the three inlet embodiment.

Figure 43:
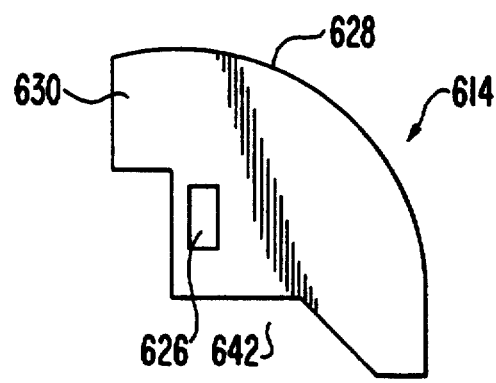
FIG. 43 is a front view of a narrow disk.

Two sets of six narrow disks 614, as shown in FIG. 43, are located between joining disk 618 and finger disks 616. Each narrow disk 614 includes an aperture 626, an arcuate upper surface 628 and an inner extending portion 630. Each narrow disk 614 is separated from one another by half spacer springs 620 and the narrow disks 614 closest to joining disk 618 are also separated therefrom by a half spacer spring 620. The two sets of narrow disks 614 are arranged as mirror images of one another about a center line extending through fixed channel forming member 602. Such an arrangement permits interdigitating of inner extending portions 630 of disks 614 to enable variable angular placement of movable channel forming members 604, 606.

Figure 44:
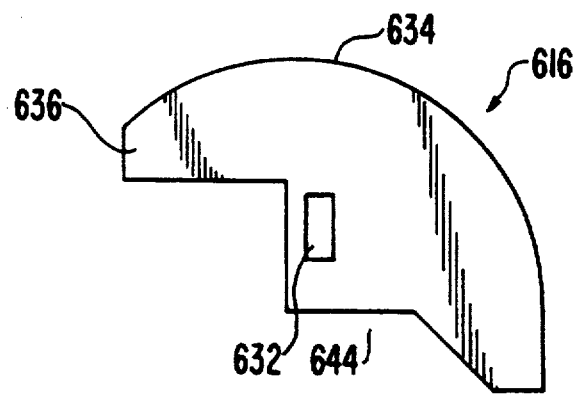
FIG. 44 is a front view of a finger disk.

Attached between each set of six narrow disks 614 and a respective movable channel forming member 604, 606 is a set of seven finger disks 616. Each finger disk 616, as shown in FIG. 44, includes an aperture 632, a partial arcuate upper surface 634 and an longer inner extending portion 636. The finger disks 616 are also separated from one another by half spacer springs 620 and the two finger disks 616 closest to movable channel forming members 604, 606 are separated therefrom by a half spacer spring 620. The two sets of finger disks 616 are also arranged as mirror images of one another about a center line extending through fixed channel forming member 602. Such an arrangement permits interdigitating of longer inner extending portions 636 of disks 616 when movable channel forming members 604, 606 are separated by a small angular displacement.

Arcuate upper surfaces 624, and partial arcuate upper surfaces 628, 634 provide support for inside of liner surface permitting the poured concrete to more effectively enter the liner gaps and voids.

Half spacer springs 620 help space disks 614, 616, 618 from each other and from the rigid forming members 602, 604, 606 provide approximately equal spacing therebetween. This arrangement helps provide a more distributed support for the liner. Half spacer springs 620 are used because the use of full spacer springs as described in conjunction with FIGS. 45-46 at these positions prevent interdigitating of the dish. Thus, half spacer springs 620 are placed on the side of resilient center blade assembly 612 which is opposite the other flexible channel forming member 604, 606.

Each resilient center blade assembly 612 penetrates joining disk 618 and a set of narrow disks 614 and finger disks 616, and provides additional vertical support thereto, if necessary. Blades assemblies 612 have one end affixed to fixed channel forming member 602, while the other end of each resilient center blade assembly 612 rests in a channel 638 provided in each movable channel forming member 604, 606. Two center blade assemblies 612 permit the disks to interdigitate and provide spine-like movement for each flexible channel forming member 604, 606, such that the flexible channel forming members 604, 606 form a "V" to converge towards fixed channel forming member 602.

The number of interdigitating disks depend on the angular spacing between the two movable channel forming members 604, 606. For instance, as pictured with the movable channel forming members 604, 606 are 90° and 270° from the fixed channel forming member 602, approximately 5 or 6 disks 614 interdigitate. However, if the movable channel forming members 604, 606 are 140° and 180° from fixed channel forming member 602, it is conceivable that 22 disks 614, 616 will interdigitate.

Not unlike their single inlet counterpart, each flexible channel forming member 608, 610, also includes a spacer bar 622 to assure that each movable forming member 604, 606 is correctly radially positioned. Each spacer bar 622 is fixedly attached to a movable channel forming member 604, 606 at one end and rotatably connected to center pivot pin 640 at the other end. Each disk 614, 616, 618 further includes a respective stepped-up portion 642, 644, 646 in the bottom center to permit the accommodation of spacer bars 622 without obstruction.

Pivot pin 640 fits within a hole 648 on the top surface 649 of interior manhole form 650. Pivot pin 640 includes a bottom shoulder portion 652 to fit within hole 648, and a shaft portion 654 having a smooth section, not shown, and a threaded section 656. Shaft portion 654 is removably fitted within shoulder portion 652 facilitating a conversion to add additional inlet assemblies. The inner ends of both spacer bars 622 have a vertical hole 658 located therein so that shaft portion 654 of pivot pin 640 can be placed through vertical holes 658 and into shoulder portion 652, such that the inside of vertical holes 658 concentrically surround smooth section of pin 640 permitting pivotal motion. A nut 660 may also be provided as a safety measure to fit over threaded portion 656 preventing spacer bars 622 from escaping pivot pin 640.

Although not shown, one spacer bar is vertically offset at its inner portion such that one spacer bar overlaps the other. This permits both spacer bars 622 to be freely rotated with their respective movable and flexible channel forming members 604, 606 without interfering with each other.

As in the single inlet channel forming device 500, top surface 649 of interior manhole form 650 includes angularly disposed holes 662 adjacent its periphery, and each movable channel forming member 604, 606 includes a hole 664 for alignment with holes 662 in top surface 649 of interior manhole form 650 at specific angular dispositions. The interior manhole form holes 662 are arranged at various increments angles between 90° and 270° from fixed channel forming member 602. Upon adjusting a movable channel forming member, for example 604, to its desired position, a pin 666 is inserted through holes 662, 664 to prevent movement of the movable channel forming member 604 with respect to interior manhole form 650. Upon affixing one movable channel member 604 to interior manhole form 650, the other movable channel member 606 may likewise be positioned as desired and affixed.

As shown in FIG. 41, disks 614, 616, 618, fixed channel forming member 602, and movable channel forming members 604, 606 are dimensioned to provide an upper surface which includes a downward slant from fixed channel forming member 602 along each flow path towards the outer end of each movable channel forming member 602, 604. This upper slanted surface forms an invert 117 with positive flow or fall along each flow path on the bottom of the formed troughs from each inlet pipe 180 to the outlet pipe 190. One preferred degree of slope 668 for an invert 117 provides a fall of 0.025 feet per foot of length. However, it should be noted that a horizontal upper surface forming a horizontal flow path, as shown in the single inlet channel forming device 500 is also within the scope of the invention as the slope design is typically a function of regional sewer requirements and specific land parameters.

To form a lined manhole base 110 for accommodating two inlet pipes, channel forming device 600 is placed onto top surface 649 of an interior manhole form 650, which is preferably an expandable and contractible fitting apparatus. In placing channel forming device 600 onto interior manhole form 650, center pivot pin 640 is placed in center hole 648 and fixed channel forming member 602 is bolted onto the interior manhole form top surface 649 by bolts 670. Each movable channel forming member 604, 606 is individually adjusted and secured for the desired angular relationship in the manner as previously described. A liner section 100 is preformed for the desired configuration of inlet and outlet pipes, as previously described in this application. The remainder of the process for forming a lined manhole base accommodating two inlet pipes is the same as previously discussed for forming a lined manhole base for a single inlet pipe.

A triple inlet-single outlet channel forming device, as shown in FIGS. 45-46, can be created from channel forming device 600 with minor modifications. Added to device 600 between the two movable channel forming members 604, 606 is a third movable channel forming member 672 and a third flexible channel forming assembly 674.

Third channel movable channel forming member 672 is identical to the other movable channel forming members 604, 606. However, third flexible channel forming member 674 is much different than the other flexible channel forming members 608, 610.

Third flexible channel forming member 674 includes different shaped and sized disks 676, 678 and different shaped and sized spacer springs 680, 682. Additionally, third flexible channel forming member 674 includes a separate blade assembly 684 which is shorter than the other blade assemblies 612 to connect movable channel forming member 672 to pivot pin 686.

Pivot pin 686 also differs from the previous pivot pin 640 including a taller center shaft portion 688 extending upwardly to a height enabling it to interface with shortened blade assembly 684. Shaft portion 688 of pivot pin 686 also fits within a similar shoulder portion 652 to readily permit modification of the channel forming device to correspond to the desired number of inlet pipes 190. Shortened blade assembly 684 is affixed at one end to shaft portion 688 by welding, bolting or in another manner well known in the art. At its other end, shortened blade assembly 684 resides in a channel 692 in third movable channel member 672 in a manner similar to blade assemblies 612 residing in channel 638, permitting pivotal movement of third channel forming member 672 within the other channel forming members 604, 606, 608, 610.

A single narrow front disk 676 and a plurality of wider disks 678 extend along blade assembly 684 between center pivot pin 686 to movable channel forming member 672. The disks 676, 678 are separated from one another by spacer springs 680, 682 in the same manner and for the same purposes as described in the previous embodiments.

The shape and sizes of disks 676, 678 and springs 680, 682 permit interdigitated motion the other two flexible channel forming members 608, 610 maximizing the number of possible angular configuration of the assembly.

In converting a two inlet configuration to a three inlet configuration, the shaft portions 654, 686 must be swapped. If used, nut 660 on the shaft portion 654 for the two inlet configuration must be removed, and shaft portion 654 may be removed by pulling upwardly and separating it from shoulder portion 648. Extended shaft portion 688 with shortened blade assembly 684 attached thereto is inserted through vertical holes 658 at the ends of the spacer bars 622 and into shoulder portion 652.

To form a lined three inlet manhole, the channel forming device is placed onto interior manhole form in the manner described previously with the two-inlet set-up, the movable and flexible channel forming members 604, 606, 608, 610 including the third movable and flexible channel forming member 672, 674 are adjusted into their desired respective positions with the movable channel forming members being attached with an alignment pin 666 which align a hole 664 with a hole in the upper surface of interior manhole form 662 at the desired angular setting. The forming of a lined base section with the three inlet arrangement is essentially the same as with the two unit arrangement and will not be repeated.

Third channel forming member 672 with flexible channel forming member 674 would have an upper surface which is either horizontal or sloped depending upon the upper profile arrangement of the remainder of the assembly.

Although not pictured, channel forming device 600 can be modified to have more than three inlets. This would be accomplished by swapping shaft portion 688 of pivot pin 686 which has one shortened blade assembly 684, with a shaft portion having two or more shortened blades assemblies, each with their own movable and flexible channel forming members.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A lined structure of settable material having a plastic liner for lining and protecting a surface of the structure, said liner comprising:
   a first side; and
   a second side opposed from said first side, said second side having a plurality of spaced raised projections adapted to be embedded within the protected surface;

wherein said raised projections are hollow;

wherein the plastic material composing the liner is resistant to corrosion; and wherein each projection includes longitudinally spaced gaps and the settable material enters the gaps and at least partially fills the hollow raised projections.

2. The lined structure of claim 1, wherein said plurality of projections includes first and second projections which are substantially perpendicular to each other.

3. The lined structure of claim 1, wherein the gaps are dovetail shaped for mechanically locking the liner to the surface.

4. The lined structure of claim 1, wherein the settable material is composed of inorganic material.

5. The lined structure of claim 1, wherein the liner having a preformed shape substantially similar to the shape of the surface of the structure to be lined.

6. A plastic liner for lining and protecting a surface, said liner comprising:

a first side; and a second side opposed from said first side, said second side having a plurality of spaced ribs adapted to be embedded within the protected surface;

wherein each rib includes cut out portions spaced along the rib for forming a mechanical lock between the liner and the surface, and each said rib includes raised ledges located below the cut out portions; and wherein the plastic material composing the liner is resistant to corrosion.

7. The plastic liner of claim 6, wherein the cutout portions are dovetail shaped.

8. The plastic liner of claim 6, wherein the liner having a preformed shape substantially similar to the shape of the surface of an inorganic structure to be lined.

9. A plastic liner for lining and protecting a surface, said liner comprising:

a first side; and a second side opposed from said first side, said second side having a plurality of spaced parallel first raised projections adapted to be embedded within the protected surface and a plurality of spaced parallel second raised projections adapted to be embedded within the protected surface;

wherein both the plurality of first raised projections and the plurality of second projections are hollow;

wherein said plurality of first raised projections intersect said plurality of second raised projections; and wherein the plastic material composing the liner is resistant to corrosion.

10. The liner of claim 9, wherein the first and second raised projections include longitudinally spaced segments with gaps formed therebetween.

11. The liner of claim 10, wherein the gaps are dovetail shaped.

12. The liner of claim 9, wherein the plurality of spaced first raised projections and the plurality of space second raised projections include gaps along their length permitting settable material to enter and at least partially the projections.

13. The liner of claim 9, wherein the first raised projections are substantially perpendicular to the second raised projections forming a grid.

14. The liner of claim 9, wherein the first side of said liner includes a plurality of grooves formed therein.

15. The liner of claim 14, wherein the grooves and the plurality of first and second projections are symmetrically located on opposite sides of the liner.

* * * * *